US011512848B2

(12) United States Patent
Huang et al.

(10) Patent No.: US 11,512,848 B2
(45) Date of Patent: Nov. 29, 2022

(54) SYSTEMS AND METHODS FOR REAL-TIME STEAM QUALITY ESTIMATION

(71) Applicant: The Governors of the University of Alberta, Edmonton (CA)

(72) Inventors: Biao Huang, Edmonton (CA); Yanjun Ma, Edmonton (CA); Seraphina Kwak, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 878 days.

(21) Appl. No.: 16/293,119

(22) Filed: Mar. 5, 2019

(65) Prior Publication Data

US 2019/0271464 A1    Sep. 5, 2019

Related U.S. Application Data

(60) Provisional application No. 62/638,582, filed on Mar. 5, 2018.

(51) Int. Cl.
*F22B 35/16*    (2006.01)
*F22B 35/18*    (2006.01)
(Continued)

(52) U.S. Cl.
CPC ............. *F22B 35/16* (2013.01); *F22B 35/18* (2013.01); *F22B 37/38* (2013.01); *G01N 11/02* (2013.01); *G01N 25/60* (2013.01)

(58) Field of Classification Search
CPC .......... F22B 35/16; F22B 35/18; F22B 37/38; G01N 11/02; G01N 25/60; G01N 9/26;
(Continued)

(56) References Cited

U.S. PATENT DOCUMENTS 4,063,228 A * 12/1977 Eggenberger ........... F22B 37/76
340/521
7,567,887 B2 * 7/2009 Emigholz .............. C10G 11/18
700/32
(Continued)

OTHER PUBLICATIONS

Xie, Li et al., "Soft sensors for online steam quality measurements of OTSGs," Journal of Process Control, vol. 23; Issue 7, Aug. 2013, pp. 990-1000. (Year: 2013).*
(Continued)

*Primary Examiner* — Jeffrey P Aiello
(74) *Attorney, Agent, or Firm* — Bereskin & Parr LLP/S.E.N.C.R.L., s.r.l.; Tony Orsi

(57) ABSTRACT

A system and method for estimating steam quality for a steam generator is provided which involves obtaining raw measurement values for process variables of the steam generator from sensors coupled to the steam generator; receiving the raw measurement values and slow-rate steam quality samples in order to determine a steam quality estimate, using a measurement module to receive the raw measurement values and determine model input values and a robustness index; using an estimator module to determines a raw steam quality estimate using the model input values and a model that is selected from several models depending on reliability of some of the raw measurements; and using a corrector module to determine the steam quality estimate using the raw steam quality estimate, robustness index, and slow-rate steam quality samples. An output receives the steam quality estimate and can provide the steam quality estimate to another device.

30 Claims, 11 Drawing Sheets

(51) Int. Cl.
*F22B 35/00* (2006.01)
*G01N 11/02* (2006.01)
*G01N 25/60* (2006.01)
*F22B 37/38* (2006.01)

(58) Field of Classification Search
CPC .............. G05B 23/0221; G05B 23/024; G05B 2219/37537; Y02P 90/02; G06N 20/00
USPC ........ 60/39.182; 73/29.01, 112.02; 165/11.1; 374/42; 700/28, 30–31, 274, 286–287, 700/291; 702/24, 85, 182–183, 185, 188; 703/2
See application file for complete search history.

(56) References Cited

U.S. PATENT DOCUMENTS

| | | | |
|---|---|---|---|
| 2007/0067114 A1* | 3/2007 | D'Amato ........... | G05B 23/0278 702/34 |
| 2012/0143382 A1* | 6/2012 | Lou ....................... | F23C 9/003 700/286 |

OTHER PUBLICATIONS

Qi, Fei et al., "Model Predictive Control of Once Through Steam Generator Steam Quality," 9th International Symposium on Advanced Control of Chemical Processes, The International Federation of Automatic Control, Whistler, British Columbia, Canada, Jun. 2015, pp. 716-721. (Year: 2015).*

Collins, D. B. et al., "Measurement of Steam Quality in Two-Phase Upflow With Venturimeters and Orifice Plates," Journal of Basic Engineering, vol. 93, Issue 1, Mar. 1971, pp. 11-20. (Year: 1971).*

Collins, "Measurement of Steam Quality in Two-Phase Upflow With Venturimeters and Orifice Plates", Journal of Basic Engineering, 1971, 93(1): 11-20.

Wagner et al., equations 15-17 and Tables 11-14, in "The IAPWS Industrial Formulation 1997 for the Thermodynamic Properties of Water and Steam", International Steam Tables: Properties of Water and Steam Based on the Industrial Formulation IAPWS-IF97 (2008): 7-150 (1-49).

Xie et al., "Soft sensors for online steam quality measurements of OTSGs", Journal of Process Control, 2013, 23(7): 990-1000.

Qi et al., "Model Predictive Control of Once Through Steam Generator Steam Quality", IFAC-PapersOnLine, 2015, 48(8): 716-721.

* cited by examiner

SYSTEMS AND METHODS FOR REAL-TIME STEAM QUALITY ESTIMATION

CROSS-REFERENCE TO RELATED PATENT APPLICATION

This application claims the benefit of U.S. Provisional Patent Application No. 62/638,582, filed Mar. 5, 2018, and the entire content of U.S. Provisional Patent Application No. 62/638,582 is hereby incorporated by reference.

FIELD

Various embodiments are described herein that generally relate to estimating steam quality of steam generators including Once-Through Steam Generators (OTSGs) and other steam generators with similar process variable measurements as OTSGs, for example.

BACKGROUND

Oil sands are sometimes buried deep below the ground and may not be extracted economically through traditional mining operations. An extraction technology termed as "In Situ" extraction has received increasing attention in the past decade. During In Situ operations, high pressure steam is continuously injected into the oil sands formation to heat the bitumen and reduce its viscosity, enabling it to be easily pumped out from the ground.

Compared with mining operations, In Situ operations have much less impact on the land surface and typically consume less water. However, this oil sands extraction method requires a large amount of natural gas to produce steam and so it is more energy intensive. The cost of bitumen recovery and the potential environmental footprint may be reduced by improving the efficiency of the steam generation facilities.

Some steam generators, such as Once-Through Steam Generators (OTSGs), function as water tube boilers, which is one main category of steam generators used for oil sands recovery. For example, the operational performance of the OTSG can be indicated by the steam quality, i.e., the mass fraction of steam in a saturated steam/water mixture. Using a steam quality that is too high may lead to deposition of solids inside the tubes, causing decreased heat transfer and a rise in tube temperature. Meanwhile, there may be insufficient liquid to wet the inside of the tubes and maintain heat transfer. This can lead to rapid rises in tube temperature, causing tube damage and eventual failure. On the other hand, when there is a low steam quality, there may be low efficiency in the OTSG.

For these reasons, maintaining steam quality in an OTSG within a tight range can help ensure optimal performance of the OTSG. Unfortunately, neither current online measurement nor lab analysis of steam quality can meet this real-time control purpose. Current real-time readings of steam quality are merely based on the calculation from a linear function, where restrictive assumptions about physical conditions on several working regions have been made. It fails to be robust against measurement noises and outliers in raw process readings and also requires frequent manual effort to adapt parameters. On the other hand, lab analysis requires manual sampling procedures, which is not sufficient for real-time feedback control.

SUMMARY OF VARIOUS EMBODIMENTS

Various embodiments of a system and method for real-time steam quality estimation are provided according to the teachings herein.

According to one aspect of the teachings herein, there is provided a system for determining a steam quality estimate of a steam generator, the system comprising an input that is configured to obtain raw measurement values for process variables of the steam generator from sensors coupled to the steam generator; a steam quality sensor that is configured to receive the raw measurement values for the steam generator and slow-rate steam quality samples in order to determine a steam quality estimate, the steam quality sensor including: a measurement module that is configured to receive the raw measurement values and determine model input values and a robustness index; an estimator module that is configured to determine a raw steam quality estimate using the model input values and a model that is selected from several models depending on reliability of a corresponding combination of the raw measurements; and a corrector module that is configured to determine the steam quality estimate using the raw steam quality estimate, the robustness index, and the slow-rate steam quality samples; and an output that is coupled to the steam quality sensor and is configured to receive the steam quality estimate and provide the steam quality estimate to another device.

In at least one embodiment, a control unit that is configured to receive the steam quality estimate and generate a control signal using the steam quality estimate to control at least one control input of the steam generator to maintain the steam quality of the steam generated by the steam generator within a desired range.

In at least one embodiment, the measurement module may be configured to determine the robustness index by determining outer upper and lower boundaries for each of the raw measurement values of the steam generator; determining inner upper and lower boundaries for each of the raw measurement values of the steam generator; identifying the raw measurement values at each time point as being normal, mild abnormal and severe abnormal based on a location of the raw measurement values relative to their corresponding outer upper and lower boundaries and the corresponding inner upper and lower boundaries; and determining the robustness index at each time point based on a number of the raw measurement values being identified as severe abnormal, mild abnormal and normal.

In at least one embodiment, the model input values can be determined by: determining a steam density for each individual pass of the steam generator; determining a heat capacity for each individual pass of the steam generator; and determining a latent heat for each individual pass of the steam generator.

In at least one embodiment, the steam density is determined based on a saturation condition and measured temperatures and pressures in the steam generator.

In at least one embodiment, the raw steam quality estimate can be determined by: selecting a first model when a differential pressure of an individual pass of the steam generator is determined to be reliable; selecting a second model when the differential pressure of an individual pass of the steam generator is determined to be unreliable and when a flow rate of an inlet gas of the steam generator and a stack temperature of waste gas of the steam generator are determined to be reliable; selecting a third model when the differential pressure of an individual pass of the steam generator, a flow rate of an inlet gas of the steam generator and a stack temperature of waste gas of the steam generator are all unreliable; and determining the raw steam quality estimate as a function of the selected model.

In at least one embodiment, the first model that is used to determine the raw steam quality estimate is based on outlet differential pressure and inlet flowrate of individual passes, and the determined steam density.

In at least one embodiment, the second model that is used to determine the raw steam quality estimate is based on inlet flowrate and outlet temperature of fuel gas, inlet flowrate of excess air, inlet flowrate, inlet temperature, and outlet temperature of individual pass, determined specific heat capacity and determined heat of vaporization.

In at least one embodiment, the third model that is used to determine the raw steam quality estimate is based on temperature and pressure of a recombined outlet node, an inlet flowrate, an inlet temperature, and an outlet temperature of the passes of the steam generator, the determined steam density, the determined specific heat capacity and the determined heat of vaporization.

In at least one embodiment, the models use regression parameters determined from historical data records of process variables and slow rate steam quality samples.

In at least one embodiment, the corrector module is configured to filter the raw steam quality estimate, and apply a bias factor that is updated based on the robustness index and the slow rate steam quality samples to reduce the drifting error.

In at least one embodiment, the corrector module is configured to employ a Kalman Filter to filter the raw steam quality estimate based on the robustness index.

In at least one embodiment, the at least one control input comprises a boiler feed water inlet valve to control a flow rate at an input node of the steam generator. Alternatively, or in addition thereto, in at least one embodiment the at least one control input comprises a firing rate or an energy inflow of the steam generator.

In at least one embodiment, the steam generator is a once-through steam generator or another steam generator from which similar process measurements are available.

In at least one embodiment, the sensors comprise fast-rate hardware sensors of the steam generator including at least one temperature sensor, at least one pressure sensor, at least one differential pressure sensor and at least one flow rate sensor.

In at least one embodiment, the fast-rate hardware sensors are configured to measure at least one of an inlet temperature, an inlet pressure of a boiler feed water of the steam generator, a flow rate of each individual pass of the steam generator, an outlet temperature of each individual pass of the steam generator, a differential pressure of each individual pass of the steam generator, a temperature or pressure of an outlet of the steam generator, a flowrate of an inlet fuel gas, a flowrate of excess air of the steam generator, and a stack temperature of waste gas.

In at least one embodiment, the slow rate steam quality samples are obtained from sample points located at outlets of the individual passes of the steam generator.

According to another aspect of the teachings herein, there is provided a method of estimating steam quality of a steam generator, the method comprising: obtaining values for raw measurement values for process variables of the steam generator from sensors coupled to the steam generator; obtaining slow-rate steam quality samples for the steam generator; determining model input values and a robustness index based on the raw measurement values using a measurement module; determining a raw steam quality estimate using an estimator module based on the model input values and a model that is selected from several models depending on reliability of a corresponding combination of the raw measurements; and determining the steam quality estimate using a corrector module based on the raw steam quality estimate, the robustness index, and the slow-rate steam quality samples.

In at least one embodiment, the method further comprises sending the steam quality estimate to a control unit that generates a control signal using the steam quality estimate to control at least one control input of the steam generator to maintain the steam quality of steam generator by the steam generator within a desired range.

In at least one embodiment, the method further comprises determining the robustness index by: determining outer upper and lower boundaries for each of the raw measurement values of the steam generator; determining inner upper and lower boundaries for each of the raw measurement values of the steam generator; identifying the raw measurement values at each time point as being normal, mild abnormal and severe abnormal based on a location of the raw measurement values relative to their corresponding outer upper and lower boundaries and the corresponding inner upper and lower boundaries; and determining the robustness index at each time point based on a number of the raw measurement values being identified as severe abnormal, mild abnormal and normal.

In at least one embodiment, the method further comprises determining the model input values by: determining a steam density for each individual pass of the steam generator; determining a heat capacity for each individual pass of the steam generator; and determining a latent heat for each individual pass of the steam generator.

In at least one embodiment, the method comprises determining steam density based on a saturation condition and measured temperatures and pressures in the steam generator.

In at least one embodiment, the method comprises determining the raw steam quality estimate by: selecting a first model when a differential pressure of an individual pass of the steam generator is determined to be reliable; selecting a second model when the differential pressure of an individual pass of the steam generator is determined to be unreliable and when a flow rate of an inlet gas of the steam generator and a stack temperature of waste gas of the steam generator are determined to be reliable; selecting a third model when the differential pressure of an individual pass of the steam generator, a flow rate of an inlet gas of the steam generator and a stack temperature of waste gas of the steam generator are all unreliable; and determining the raw steam quality estimate as a function of the selected model.

In at least one embodiment, the method comprises using several models including a first model that is used to determine the raw steam quality estimate based on outlet differential pressure and inlet flowrate of individual passes, and the determined steam density.

In at least one embodiment, the method comprises using several models including a second model that is used to determine the raw steam quality estimate based on inlet flowrate and outlet temperature of fuel gas, inlet flowrate of excess air, inlet flowrate, inlet temperature, and outlet temperature of individual pass, determined specific heat capacity and determined heat of vaporization.

In at least one embodiment, the method comprises using several models including a third model that is used to determine the raw steam quality estimate based on temperature and pressure of a recombined outlet node, an inlet flowrate, an inlet temperature, and an outlet temperature of the passes of the steam generator, the determined steam density, the determined specific heat capacity and the determined heat of vaporization.

In at least one embodiment, the method comprises using regression parameters for the several models where the regression parameters are determined from historical data records of process variables and slow rate steam quality samples.

In at least one embodiment, the method comprises using the corrector module to filter the raw steam quality estimate, and apply a bias factor that is updated based on the robustness index and the slow rate steam quality samples to reduce the drifting error.

In at least one embodiment, the method comprises using a Kalman Filter to filter the raw steam quality estimate based on the robustness index.

In at least one embodiment, the method comprises measuring at least one of an inlet temperature, an inlet pressure of a boiler feed water of the steam generator, a flow rate of each individual pass of the steam generator, an outlet temperature of each individual pass of the steam generator, a differential pressure of each individual pass of the steam generator, a temperature or pressure of an outlet of the steam generator, a flowrate of an inlet fuel gas, a flowrate of excess air of the steam generator, and a stack temperature of waste gas using fast-rate hardware sensors.

In at least one embodiment, the method comprises obtaining slow rate steam quality samples from sample points located at outlets of the individual passes of the steam generator.

In at least one embodiment described according to the teachings herein, there is provided a system for determining a steam quality estimate of a steam generator, the system comprising an input that is configured to obtain raw measurement values for process variables of the steam generator from sensors coupled to the steam generator; a steam quality sensor that is implemented by a processor that is configured to receive the raw measurement values for the steam generator and slow-rate steam quality samples in order to determine a steam quality estimate by: receiving the raw measurement values and determining model input values and a robustness index; determining a raw steam quality estimate using the model input values and a model that is selected from several models depending on reliability of a corresponding combination of the raw measurements; and determining the steam quality estimate using the raw steam quality estimate, the robustness index, and the slow-rate steam quality samples; and an output that is coupled to the steam quality sensor and is configured to receive the steam quality estimate and provide the steam quality estimate to another device.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
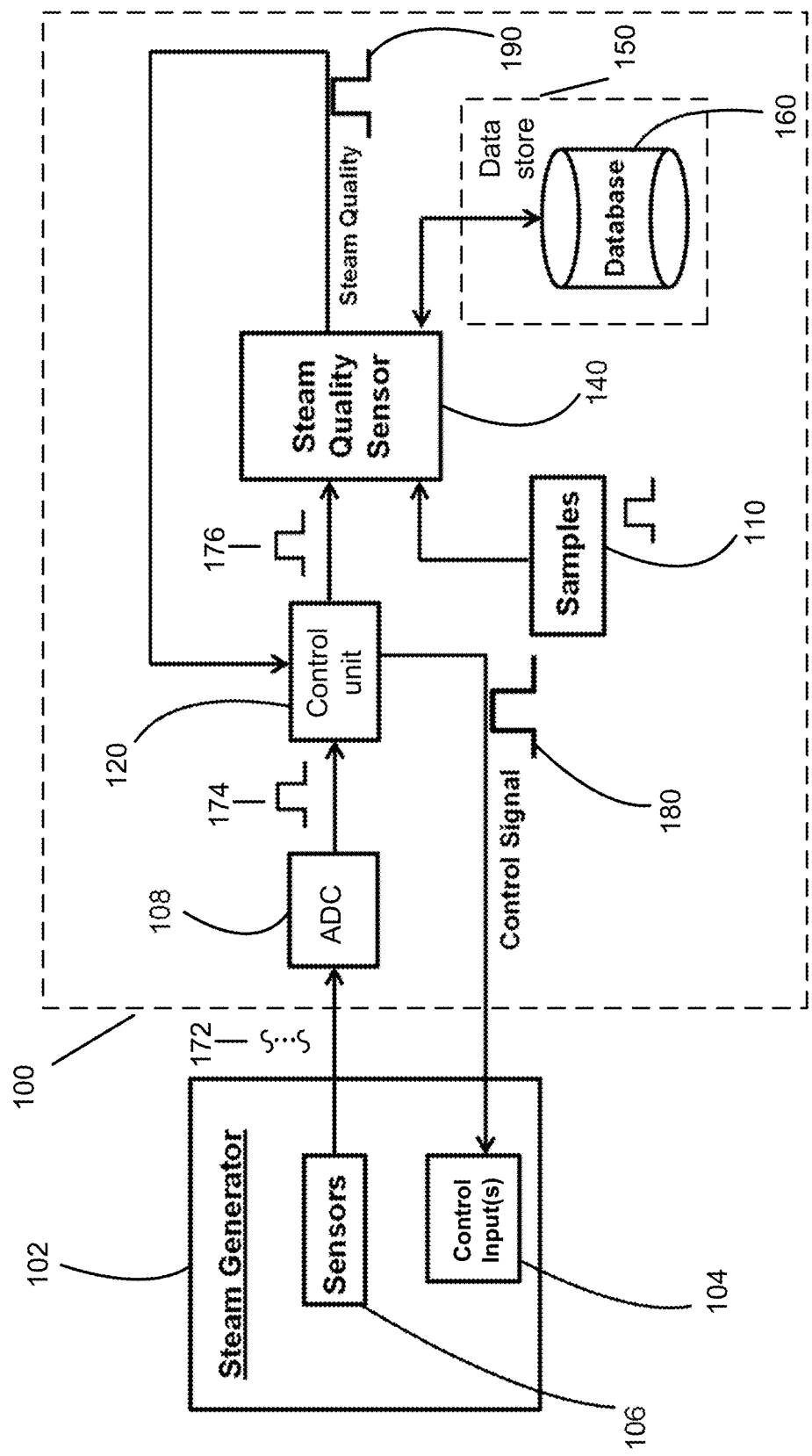
FIG. 1 illustrates an example embodiment of a control system that can provide a better estimate of the steam quality of a steam generator in accordance with the teachings herein.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical signal, electrical connection, a mechanical element, a fluid or a fluid transport pathway depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

The example embodiments of the devices, systems or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e. at least one volatile memory element and at least one non-volatile memory element). The hardware may comprise input devices including at least one of a touch screen, a keyboard, a mouse, buttons, keys, sliders and the like, as well as one or more of a display, a speaker, a printer, and the like depending on the implementation of the hardware.

It should also be noted that there may be some elements that are used to implement at least part of the embodiments described herein that may be implemented via software that is written in a high-level procedural language such as object oriented programming. The program code may be written in MATLAB, C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a computer readable medium such as, but not limited to, a ROM, a magnetic disk, an optical disc, a USB key and the like that is readable by a device having a processor, an operating system and the associated hardware and software that is necessary to implement the functionality of at least one of the embodiments described herein. The software program code, when read by the device, configures the device to operate in a new, specific and predefined manner in order to perform at least one of the methods described herein.

Furthermore, at least some of the programs associated with the devices, systems and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Various embodiments for systems and methods for providing real-time estimation of steam quality in steam generators are described in accordance with the teachings herein. While the various embodiments herein are described with respect to an OTSG, it should be understood that the teachings herein can be adapted to other types of steam generators.

OTSGs create wet steam by heating feed water through an uninterrupted bank of tubes and have been widely utilized in Enhanced Oil Recovery (EOR), especially in Steam Assisted Gravity Drainage (SAGD) processes. One of the typical indicators of the operating condition for OTSGs, or any other steam generators, is the steam quality in the discharged flow, i.e., the mass fraction of steam in a steam/water mixture (e.g. wet steam). To balance heat transfer and maximize efficiency as well as prevent equipment damage, it is desired for all individual passes to produce steam quality as similar as possible. By knowing the steam quality values from the individual passes, the individual inlet boiler feed water flowrate of a given steam generator can be controlled to maintain similar steam quality values in all passes.

In one aspect, the teachings herein provide for real-time (fast-sampling-rate) measurement of steam quality for several individual parallel passes in an OTSG without interfering with the steam generation process. With the real-time measurement of steam quality, the firing rate and energy flow of an OTSG can be more efficiently controlled to achieve a desired steam quality. Real-time measurement of steam quality can therefore allow for an improvement in efficiency of the steam generation facilities and a reduction in energy consumption thus minimizing the environmental footprint.

The required energy may be determined from the enthalpy difference between target discharge fluids and current discharge fluids. While conventionally the current steam quality is obtained from off-line analysis (about six hours for each steam quality determination in conventional practices), the fluctuations within the 6-hour intervals are unknown and cannot be reduced by controlling the energy inputs. Thus, the real-time estimation of steam quality, in accordance with the teachings herein, can provide an efficient usage of energy input.

Accurate steam quality estimation can be used to increase the target steam quality without exceeding its upper limit thereby also improving operational efficiency. For example, at the downstream unit of an OTSG, a steam separator separates dry steam from water for the well-heads used in SAGD operations and recycles the water for re-processing. However, with the real-time measurement of steam quality, controllers can increase the set point on steam quality thus reducing the amount of re-processed water and improving the energy efficiency in producing dry steam.

In another aspect, the teachings herein may be used to increase the safety for OTSGs. Firstly, the steam quality can be controlled below an upper limit to avoid the dry-out point and to extend the service life of the heating tubes. With the real-time measurement of steam quality, any violations from this upper limit will be detected instantly, thus protecting the health of OTSGs. Secondly, since several regular process measurements, such as pressures, temperatures and flow-rates, and their correlations are utilized in the embodiments described in accordance with the teachings herein, any abnormality in these measurements or their correlations can be detected and reported as an alarm signal; for example, the drifting phenomenon of temperature measurement in individual passes can be detected. Accordingly, this monitoring feature of the teachings herein increases operational safety.

The real-time measurement of steam quality also advantageously allows for maintaining a good operational performance of steam generation facilities. Any overly high steam quality can lead to deposition of solids inside tubes and cause damage to the tubes. On the other hand, a steam quality that is too low indicates a low efficiency of the steam generators, which consequently fail to fulfil the requirements for downstream processes. Therefore, if steam quality can be controlled in a tight range, optimal performance of steam generation facilities can be ensured.

A reliable measuring approach of steam quality is conventionally obtained using manual readings (e.g. measurements of steam quality that have been analyzed in the lab), but these manual readings usually have an unsatisfactory sampling rate for control and monitoring purposes. While conventional sensors or calculations can provide online readings, they suffer from imprecision, large noise, and slow drifting issues.

Accordingly, there has been a movement towards using inferential sensing systems, or soft sensors, to provide an alternative effective solution to the aforementioned downfalls. The soft sensor, established from previous knowledge and historical data records, takes commonly measured process variables such as system inputs and produces values for key process variables such as steam quality as the system output. Inferential sensing has been successfully applied in various process industries. Its popularity is because soft sensors are not only convenient to implement on existing distributed control systems (DCS), but they are also easy to maintain and adjust for different plants. Typically, for the task of online steam quality estimation in OTSGs, the key process variable is the steam quality of each individual pass outlet.

An earlier steam quality soft sensor has previously been developed by Xie et. al. at the University of Alberta, and published in the Journal of Process Control (see L. Xie, Y. Zhao, D. Aziz, X. Jin, L. Geng, E. Goberdhansingh, F. Qi, B. Huang*. "Soft sensors for online steam quality measurements of OTSGs." *Journal of Process Control* 23.7 (2013): 990-1000). By assuming that the total energy input (Q) is distributed equally to the individual passes ($Q^{(i)}$):

$$Q^{(i)}(t)=\xi_i \cdot Q(t), \quad (1)$$

the core inference structure of the individual steam quality ($X_i$) was developed with the steam quality estimation in the recombined tube (X) according to equation 2.

$$X_i^m(t)=f(X(t)) \quad (2)$$

By using manual sampled readings (such as sample measurements of steam quality that have been analyzed in the lab), an online correction term, b(t), was introduced to correct the bias from the manual sampled reading ($SQ_i$):

$$X_i(t) = X_i^m(t) + b(t), \quad (3)$$

$$b(t) = \begin{cases} b(t-1) & \text{if manual reading unavailable,} \\ b(t-1) + \alpha \cdot [SQ_i(t) - X_i(t)] & \text{otherwise} \end{cases} \quad (4)$$

A dynamic model was then established to use commonly measured process variables (sampled at a fast-rate) and manual sampled readings (sampled at a slow-rate) to provide a fast-rate measurement of steam quality. This dynamic model consists of four parameters, which were determined from historical data records of precise measurements (for example, from manual sampled readings) and a prior art identification algorithm (i.e. Prediction Error Method). To maintain the robustness of the soft sensor, outliers in the process variables were detected using Hampel's method, and raw process measurements were preprocessed according to the detection results.

However, there are challenges in applying the above conventional soft sensor strategy in general practice. For example, the problem generally faced with OTSGs is the accessibility of fast-rate steam quality measurements in the recombined tube. First, not all OTSGs are equipped with sensors for the fast-rate estimation of recombined steam quality, which requires signals and analysis from downstream units. Any simple replacement of this important input has been unsatisfactorily performed with prior art techniques. Second, manually sampled readings do not possess high quality in general applications; there is measurement noise and human errors with manual sample readings. Furthermore, the parameter estimation in the above-mentioned method heavily relies on the precision of each sampled reading point, which causes a certain level of difficulty in deploying it.

In one aspect, in accordance with the teachings herein, an inferential sensing system is provided which can provide real-time steam quality estimation for process control and optimization of OTSGs without requiring recombined steam quality measurement. This may be possible by using a sensor, which can estimate steam quality for individual passes in real-time, in accordance with the teachings herein. In at least one example embodiment described herein, the sensor can be an inferential sensor that can be applied for different plants and employs different models for estimating steam quality where the model that uses the sensed values having the most reliability can be used to estimate steam quality data. This is not currently done with conventional soft sensors and therefore the conventional soft sensors will have decreased performance when the sensed data that is used is less reliable.

The sensors in accordance with the teachings herein have advantages due to using better model structure and inference techniques. First, in the conventional soft sensor, there are four parameters that are estimated, which introduces more uncertainties compared to the models used in accordance with the teachings herein which have fewer parameters and better structure. Second, the conventional parameters are estimated using a conventional identification method which uses dynamic models, and has more restrictive assumptions on the accuracy of manually sampled readings.

Referring now to FIG. 1, there is shown an example embodiment of a control system 100 for controlling a steam generator 102. Part of the control system 100 determines steam quality estimates for the steam generator 102. In some embodiments, the control system 100 may be further configured to generate a control signal 180 based on the determined steam quality estimate and send the control signal 180 to one or more control input(s) 104 of the steam generator 102 to maintain the steam quality produced by the steam generator 102 within a desired range.

The control system 100 generally comprises an analog-to-digital converter (ADC) 108, a control unit 120, a steam quality sensor 140, and a data store 150 including at least one database 160. The control system 100 can include a power unit (not shown) or be connected to a power source to receive power needed to operate is components. It should be noted that the components shown in FIG. 1 are provided as an example and there may be more or less components or alternative layouts in other embodiments.

The control unit 120 controls the operation of the control system 100 and can be any suitable processor, controller or digital signal processor that can provide sufficient processing power depending on the configuration and operational requirements of the control system 100 as is known by those skilled in the art. For example, the control unit 120 may be one of many high performance general processors within a DCS. In alternative embodiments, the control unit 120 may include more than one processor with each processor being configured to perform different dedicated tasks. In alternative embodiments, specialized hardware can be used to provide some of the functions provided by the control unit 120, such as at least one ASIC and/or FPGA.

Generator sensors 106, which may also be referred to as fast-rate hardware sensors and are described further below, are part of the control system 100 and are used to monitor the operation of the steam generator 102 such as monitoring for one or more conditions of the steam generator 102. The sensors 106 measure signals 172 that are then sent to the control system 100. For example, the operational conditions of the steam generator that may be measured as signals 172 include an inlet temperature, an inlet pressure of a boiler feed water of the steam generator 102, a flow rate of an individual pass of the steam generator, an outlet temperature of the individual pass of the steam generator, a differential pressure of the individual pass of the steam generator, a temperature and/or pressure of an outlet of the steam generator, a flowrate of inlet fuel gas, a flowrate of inlet excess air, a stack temperature of waste gas, and a previously measured steam quality. However, it should be understood that in some embodiments or circumstances not all of these measurements may be available in which case trivial or dummy signals, such as all zeros or "NaNs", for example, can be used. The previously measured steam quality can be a slow-rate sample that is obtained using laboratory measurements as is known by those skilled in the art.

Figure 5:
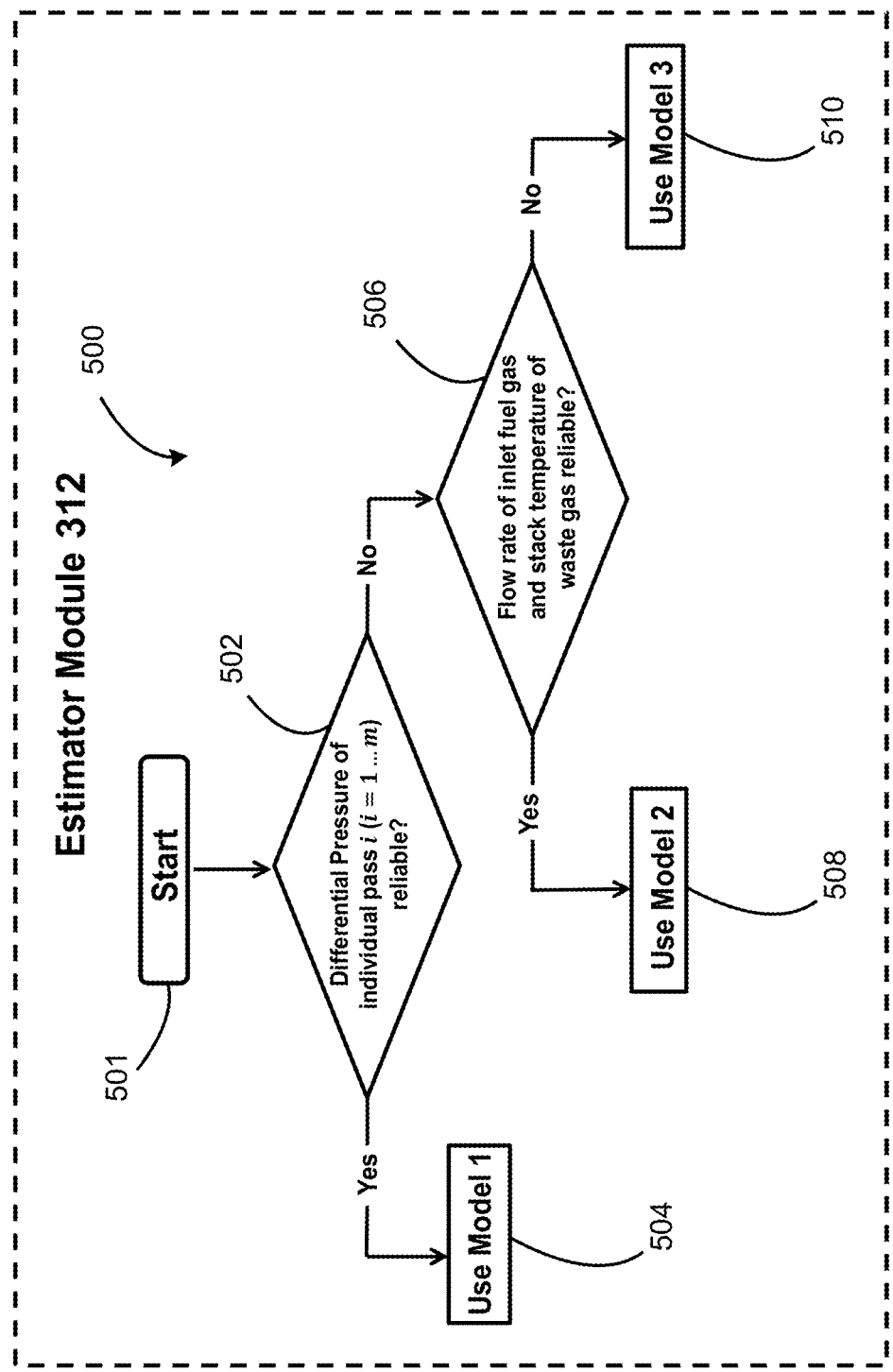
FIG. 5 illustrates a flowchart of an example embodiment of a raw steam quality estimation method performed by an estimator module in accordance with the teachings herein.

The steam quality sensor 140 is robust in that it can provide a steam estimate for various different types of combinations of measurements that are actually obtained by performing the model selection in a sequential manner (as shown in FIG. 5). A model may be selected from several models depending on the reliability of a corresponding combination of the raw measurements. For example, when the differential pressure is not reliable, Model 1 is used. As the last candidate, Model 3 uses the least reliable inputs. Otherwise, the Raw Steam Quality 320 may not be a meaningful output and final prediction will rely on the corrector module 314. An example embodiment of a combination of the raw measurements used for model selection is shown in FIG. 5.

The analog signals 172 from the sensors 106 are converted into digital signals 174 by the ADC 108 and which are then sent to the control unit 120. For example, the sensors 106 can transmit process analog variables $PV_{1:K}$ to the ADC 108 which are then digitized and sent to the control unit 120. The analog signals 172 may also be known as fast rate measured variables. The control unit 120 is coupled to the steam quality sensor 140 and provides measurement signals 176 thereto as described in further detail below. Samples 110 (e.g. samples of steam quality that are measured from lab analysis) are also inputted to the steam quality sensor 140. The samples 110 may be obtained using about 6-hour intervals. Accordingly, there is an input for obtaining raw measurement values for process variables of the steam generator from sensors 106 coupled to the steam generator 102 and providing these raw measurement values to the steam quality sensor 140.

The steam quality sensor 140 senses and records certain heat transfer and related parameters of the steam generator 102 using the measurement signals 176 sent by the control unit 120 and the samples 110 in order to determine a steam quality of the steam or wet steam that is produced by the steam generator 102. The steam quality sensor 140 is also in communication with the database 160. The steam quality 190 determined by the steam quality sensor 140 is used as feedback and sent to the control unit 120. The steam quality 190 may be the estimated steam quality for each of the individual passes of the steam generator 102. The control unit 120 may then recombine the steam quality estimates for the individual passes and use the recombined steam quality estimate to adjust the control inputs for the steam generator 102 to produce a desired steam quality. Alternatively, the control unit 120 may use the individual steam quality estimates for each individual pass to adjust the control inputs of the steam generator 102 to produce a desired steam quality. The implementation of the control unit 120 to perform either of these two-aforementioned control mechanisms is known by those skilled in the art.

Figure 3A:
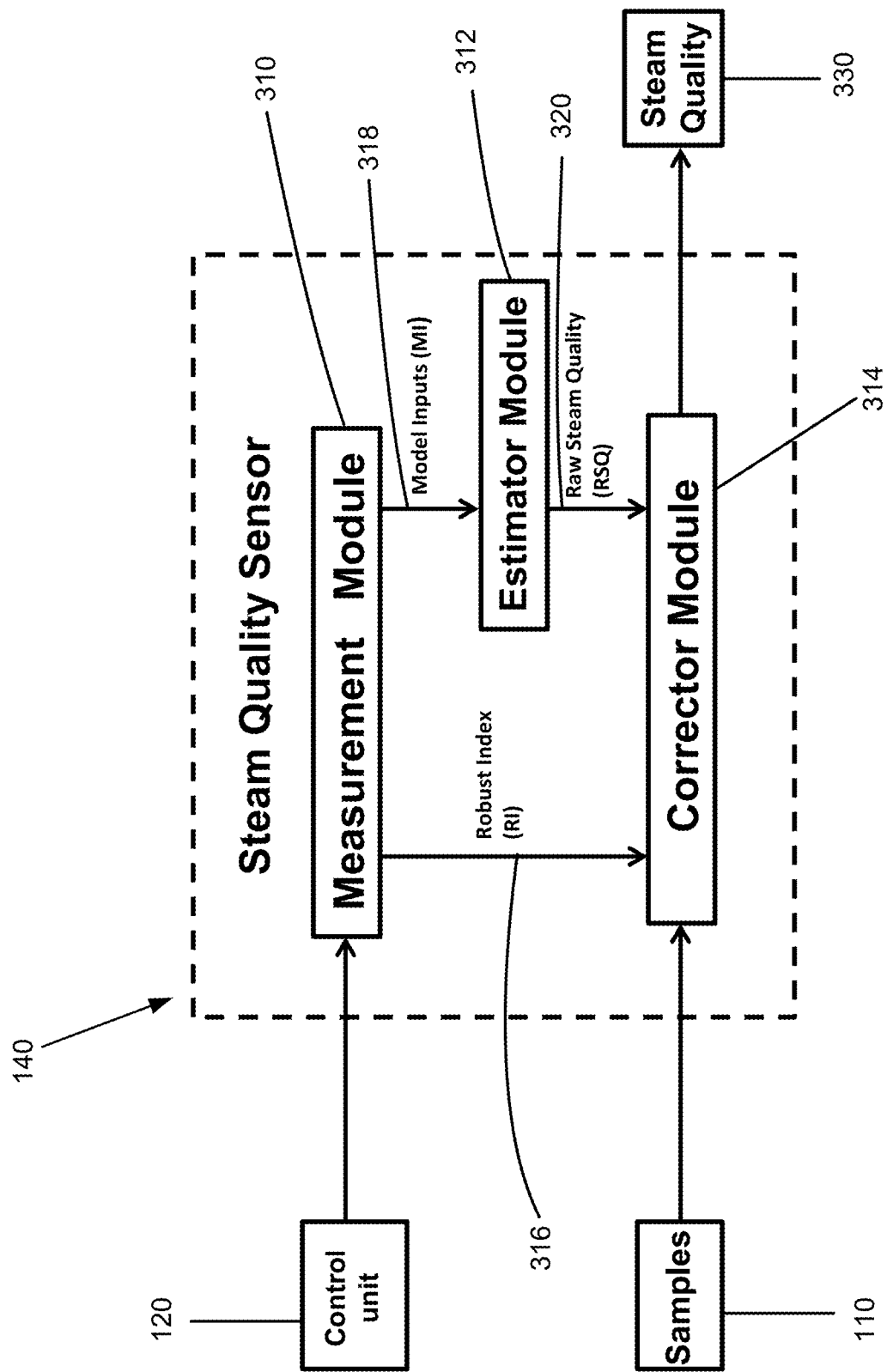
FIG. 3A illustrates an example embodiment of a steam quality sensor in accordance with the teachings herein.

The steam quality sensor 140 can be implemented using several software modules as shown in FIG. 3A, for example. The software modules include program code that are executed by a processor. Accordingly, the processor implements the functionality of the modules when executing the program code of the modules. The processor can be any suitable processor, controller or digital signal processor that can provide sufficient processing power depending on the configuration and operational requirements of the steam quality sensor 140 as is known by those skilled in the art. In some embodiments, the steam quality sensor 140 may be implemented using more than one processor with each processor being configured to perform different dedicated tasks. In alternative embodiments, the steam quality sensor can be implemented using hardware like a Field Programmable Gate Array (FPGA), an Application-Specific Integrated Circuit (ASIC) or other suitable hardware that can store several state values and calculate summations, multiplications, and logical operators.

The control unit 120 then determines a value for the control signal 180 to control the steam quality of the steam generator 102 and sends the control signal 180 to the control input(s) 104 of the steam generator 102. For example, the control input(s) 104 can include an input signal for a valve for a boiler feed water inlet of the steam generator 102. A flowrate of the inlet of the boiler feed (i.e. feed water flow) can be controlled by controlling the valve to maintain the steam quality within a desired range. Alternatively, or in addition thereto, the control input(s) can include at least one of a firing rate, an air flow and an energy flow for the combustion process used by the steam generator. The control signal 180 can be generated from an existing controller algorithm, such as a PID controller algorithm or a Model Predictive controller algorithm. The particular control method that is utilized is known to those skilled in the art. However, it should be understood that the control method can be implemented more accurately by using a steam quality estimate that is generated in accordance with the teachings herein.

The data store 150 includes voltage and non-volatile memory elements such as, but not limited to, one or more of RAM, ROM, one or more hard drives, one or more flash drives or some other suitable data storage elements. The data store 150 may be used to store an operating system and programs as is commonly known by those skilled in the art. For instance, the operating system provides various basic operational processes for the control unit 120 and the programs include various operational and user programs so that a user can interact with the control unit 120 to configure the control system 100. The data store 150 may also include software code for implementing various components of the steam quality sensor 140 such as the modules shown in FIG. 3A, for example.

The data store 150 can also be used to store one or more databases 160. For example, various operational parameters and models that are needed for the operation of the control system 100 may be stored in the database 160. In addition, historical values for these operational parameters as well as parameters used for the models may be stored in the database 160. The database 160 may also store different kinds of operational parameters such as, but not limited to, (1) static parameters, such as boundaries and regression parameters that may be used by the measurement module 310 and the estimator module 320; and (2) time varying parameters, which may also be referred to as state parameters, in the corrector module 314 (these modules are shown in FIG. 3A). These historical values may be used for fine-tuning the operation of the steam quality sensor 140 as described in further detail herein.

In manufacturing plants, there are many variables/sub-systems that can be monitored and controlled to ensure safety, maximum efficiency, and the like. Some control systems, such as a distributed control system (DCS) that is used by an OTSG, can control its sub-systems separately but can monitor them together. In other words, a DCS can have multiple independent control nodes for various sub-systems but these control nodes can be connected for communication/monitoring purposes. Therefore, since a DCS has multiple control nodes, failure of a single sub-system (one control node) will not affect the performance of the whole plant unlike a centralized control system (CCS). For this reason, the majority of manufacturing processes now use a DCS to control the plant.

Analog measurement signals 172 can be obtained from the sensors 106 that are associated with various instruments such as thermocouples, differential pressure (DP) cells, flow meters and pressure gauges as is known by those skilled in the art. The measurements provide values for certain variables such as fuel gas flowrate, stack gas temperature, recombined temperature/pressure for certain components of the steam generator for each pass as well as inputs and outputs of the steam generator, and these measurements can be obtained with relatively high accuracy based on currently used sensors as is known in the art. Based on safety concerns, any severe conditions in these measurements can indicate a warning situation for the whole steam generator 102. Since digital signals are easier to process with computers, the measured analog 172 are converted into digital signals 174 before being used by the control unit 120.

The ADC 108 and the control unit 120 can be part of an existing DCS as a DCS can take the available real-time digital signals and sampled readings as its inputs and various software aspects of the control system can be programmed in various DCS programming languages. For a specific example implementation, the historical data records of process variables and slow rate sampled readings 110 are used to determine regression model parameters that are used by the sensor 140 and to remove any slow drifting of the model, which helps improve the accuracy of predictions made by the model. For example, with a limited number of model parameters (at most three values), the model can be easily adapted to OTSGs in other operating plants. The sampled readings are allowed to have some time delay and the sampling rate can be further reduced. For example, lab samples are conventionally obtained every 6 hours. However, when using a steam quality sensor, in accordance with the teachings herein, the lab samples are not needed as frequently and can be obtained every 7, 8, 12 or even up to every 48 hours, which further reduces the manual effort since the steam quality sensor 140 is able to provide accurate steam quality estimates on a more frequent basis.

Figure 2:
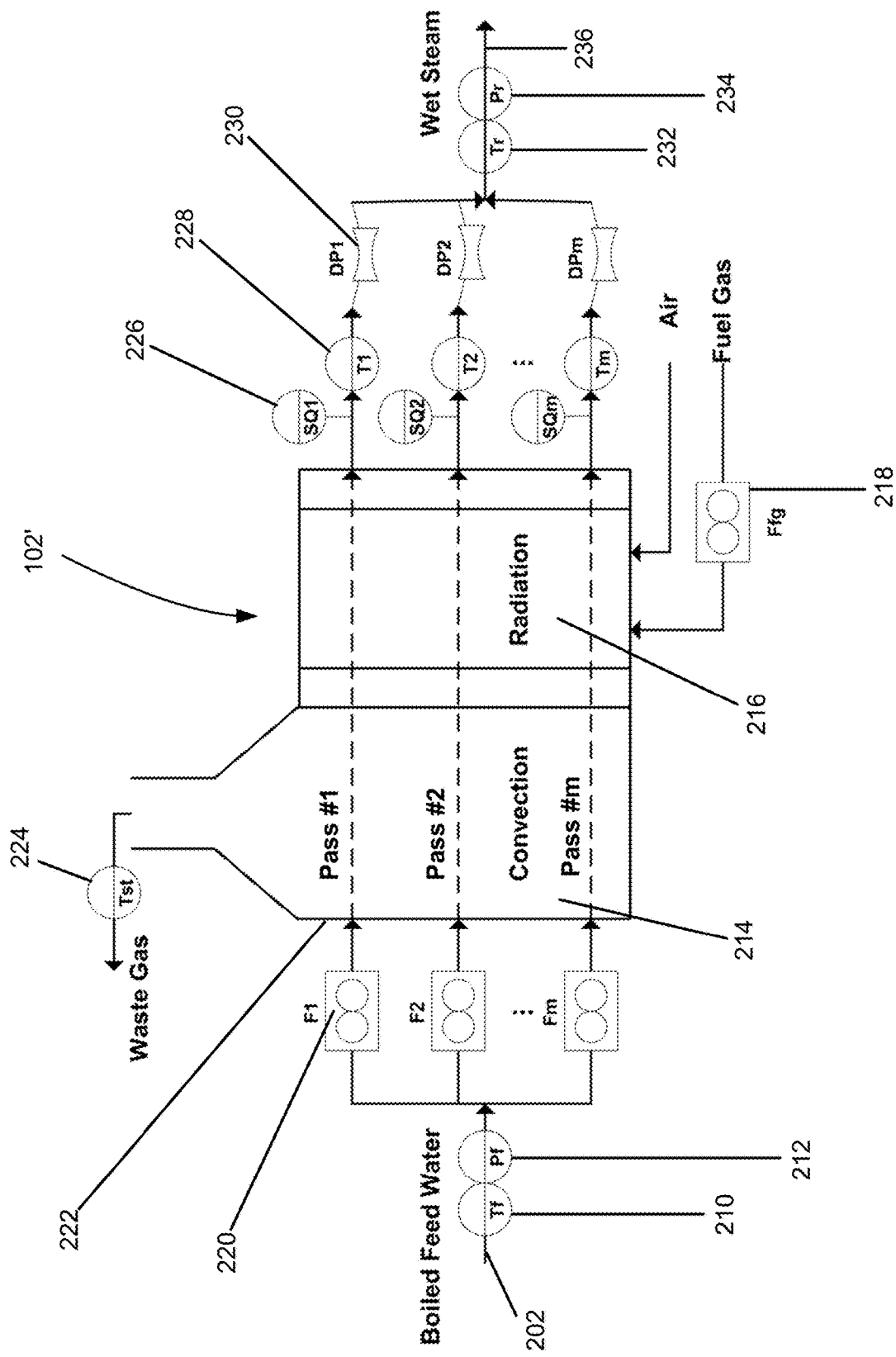
FIG. 2 illustrates an example schematic diagram of a steam generator in accordance with the teachings herein.

Referring now to FIG. 2, shown therein is an example embodiment of a schematic diagram of a steam generator, such as an OTSG (102'). The OTSG has an input tube to receive Boiler Feed Water (BFW). The operation of an OTSG is to boil the BFW to a saturated mixture of water and steam, reaching a certain level of steam quality. Accordingly, the OTSG 102' further comprises a convection chamber 214 and a radiation chamber 216. To facilitate the heat exchange with sufficient efficiency, the inlet tube 202 is usually divided into several individual passes and the BFW is split to flow into each of the passes. The passes then extend through the convection chamber 214 of the OTSG 102', where excess heat from combustion is used to preheat the BFW before it enters the radiation chamber 216. In the radiation chamber 216, heat from the combustion reaction of fuel gas and excess air is used for heat exchange after which the individual passes are merged into a single output tube 236. For example, individual passes #1 and #2 are generally shown at 222 and there are up to m passes where m is an integer. A fuel gas is used as a heating medium. The fuel gas can be a mixed gas or a sweet gas. The m passes then are recombined as a single, bigger pass.

Each pass of the OTSG 102' also includes an inlet flowmeter 220 to measure the fluid flow rate at an input 222 of each pass, a temperature sensor 228 to measure the temperature of the fluid of each pass, and a differential pressure sensor 230 to measure the differential pressure at the output of each pass. The OTSG 102' also includes a temperature sensor 232 and a pressure sensor 234 to measure the temperature and pressure, respectively, an output 236 of the OTSG 102'. The OTSG 102' also includes temperature sensor 210 and pressure sensor 212 to measure temperature and pressure at the input tube 202. The output of the OTSG 102' may be steam or wet steam. The SQ readings 226 are also obtained to measure the steam quality at an output of each pass. The SQ reading is obtained manually by field operators from the sample point located on the individual outlet passes of the OTSG. For example, the SQ readings 226 (obtained from the samples 110) are obtained manually at a slow rate, such as sampled in every 6 hours. Within this sampling interval, this reading can only hold the previous value (as a constant). Thus, it cannot reveal actual variations in steam quality and cannot provide the control system with the actual variations in steam quality over this long sampling interval.

The various pressure, temperature and flow rate sensors used with the OTSG 102' may be generally referred to as generator sensors which provide a plurality of process variables for monitoring the operation of various elements of the OTSG 102'. For example, the process variables, $PV_{1:K}$, that are measured by the generator sensors can generally include:

$T_f$: the inlet temperature of the overall Boiler Feed Water (BFW);
$P_f$: the inlet temperature and pressure of the overall BFW;
$F_i$ (i=1 . . . m): the flow rate of each individual parallel pass;
$T_i$ (i=1 . . . m): the outlet temperature of each individual pass;
$DP_i$ (i=1 . . . m): the differential pressure of each individual pass (e.g. individual Pass #1 is shown at 222);
$T_r$, $P_r$: the temperature and pressure of the recombined outlet;
$F_{fg}$: the flowrate of inlet fuel gas;
$F_{air}$: the flowrate of excess air; and
$T_{st}$: the stack temperature of waste gas, where the subscript i is used to indicate the variables of the i-th pass. The process variables can represent conditions measured by the sensors used with the steam generator 102' at a definite point in time. In addition, sampled readings of steam quality are obtained for each individual pass $SQ_i$ (i=1 . . . m) and may be used to perform corrections by the steam quality sensor module 140.

Using the above measurements, the steam quality sensor 140 may provide online steam quality estimates for each individual pass. However, as noted earlier, there may be some cases where each of these measurements is not obtained but the steam quality sensor 140 is robust in that it can still provide a steam quality estimate when some of these measurements are not provided.

The estimation of steam quality in accordance with the teachings herein comprises several steps. Firstly, the model parameters for the process variables and model structure are tuned with historical data for the process variables and sampled steam quality measurements. Secondly, after validating the model structure and model parameters, the steam quality sensor 140 is implemented using programming language that is consistent with the control system (e.g. DCS) language. Thirdly, the offset of the model and the parameters is considered and an online testing procedure is applied to validate the real-time performance of the steam quality sensor. These steps are described in further detail below. The performance of a steam quality sensor, in accordance with the teachings herein, has been determined for a number of OTSGs. One of the test results, shown in FIG. 8, indicates that a steam quality sensor implemented in accordance with the teachings herein can provide more accurate real-time estimation of steam quality than a conventional technique.

Figure 3B:
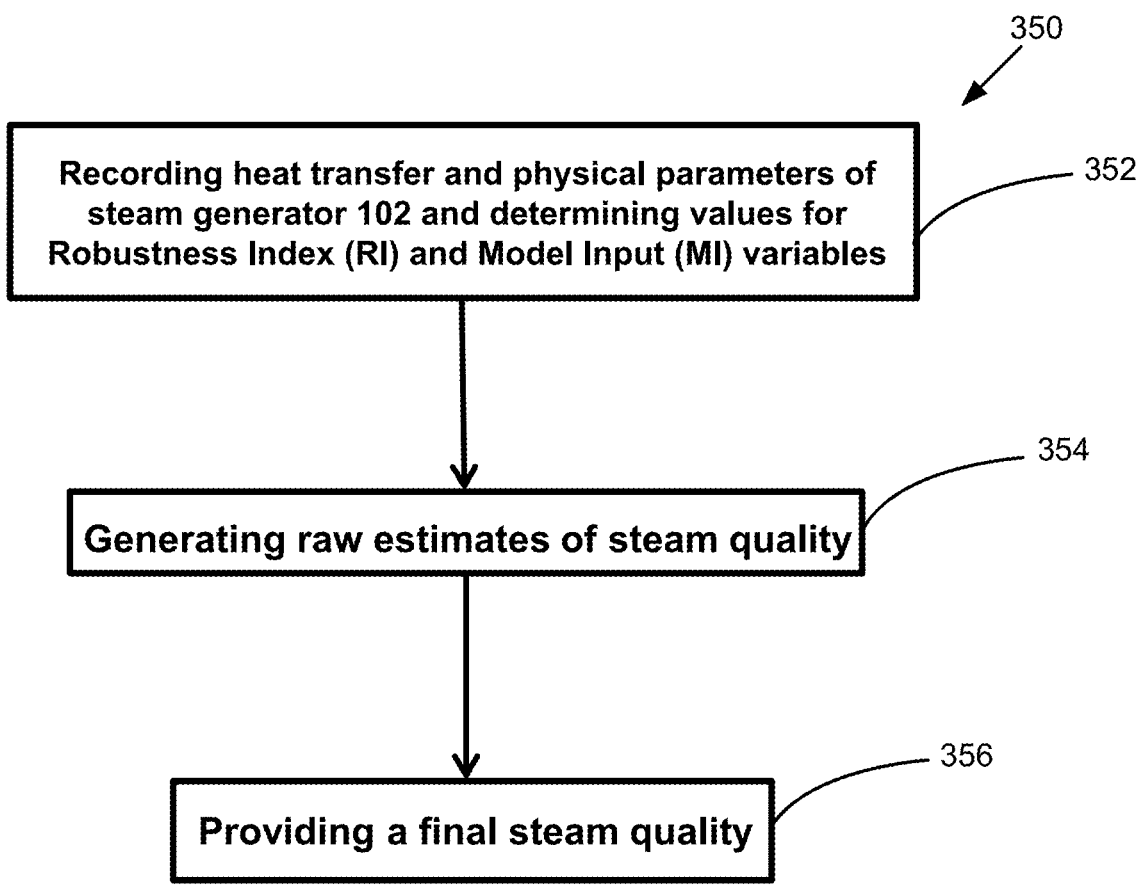
FIG. 3B illustrates a flowchart of an example embodiment of a method for determining steam quality in accordance with the teachings herein.

Referring to FIGS. 3A and 3B, shown therein are example embodiments of the steam quality sensor 140 and a steam quality estimation method 350, respectively, in accordance with the teachings herein. The steam quality sensor 140 comprises a measurement module 310, an estimator module 312, and a corrector module 314. In other embodiments, the number and arrangement of the components of the steam quality sensor 140 may be different as long as the same overall functionality is provided. The modules 310, 312 and 314 are typically implemented using software. Some of the modules may be combined or further sub-divided in alternative embodiments.

In general, at act 352 of the steam quality estimation method 350, the measurement module 310 records values for heat transfer and physical parameters of the steam generator 102 (i.e. the process variables) and determines values for a Robustness Index (RI) 316 that indicates the operational condition of the steam generator 102. The values for heat transfer and related parameters (such as parameters K, b, alpha and the like which are described below) are provided to the steam quality sensor 140 by the control unit 120. These parameters can be saved in a database, such as the database 160. Accordingly, the measurement module 310 monitors the operational status embodied by measurements of physical parameters and other variables for the steam generator 102 which are indicated as model input (MI) variables 318. The measurement module 310 is coupled with the estimator module 312 to provide the values for the MI variables 318. The measurement module 310 is also coupled to the corrector module 314 to provide the RI value 316. An example embodiment of a measurement method 400 that may be employed by the measurement model 310 is described in further detail with respect to FIGS. 4A-4C and the associated text.

At act 354 of the steam quality estimation method 350, the estimator module 312 can determine Raw Steam Quality (RSQ) estimates 320 as a function of the selected model type and the corresponding MI variables 318. The estimator module 312 includes several models that it can select from for performing the estimation where the model is selected based on the process variables that can be measured from the steam generator 102. For example, in some embodiments, the estimator module 312 may have three models. The models can be empirically determined which can involve tuning certain parameters used by the models. By using more than one model, the steam quality sensor 140 is able to select which model provides the most reliable steam quality estimate based on various conditions, as will be described in more detail below. In other embodiments, the soft sensor 140 may use a different number of models such as two models or more than three models.

The estimator module 312 is coupled to the corrector module 314 to provide the RSQ estimates 320 thereto. An example embodiment of a raw steam quality estimation method 500 that may be employed by the estimator module 312 is described in further detail with respect to FIG. 5 and the associated text.

At act 356 of the steam quality estimation method 350, the corrector module 314 is used to provide a final estimate of the steam quality 330 as a function of the RSQ estimates 320, the RI value 316, and the steam quality samples 110. The steam quality samples 110 can be a slow-sampling-rate signal of reference values from any trustable analysis of steam quality, such as manual readings obtained by field operators. The final steam quality estimate 330 can be used for real-time process control and optimization for the steam generator 102. For example, an output that is coupled to the steam quality sensor 140 can receive the steam quality estimate and provide the steam quality estimate to another device, such as the control unit 120, for example. An example embodiment of a steam quality correction estimation method 600 that may be employed by the corrector module 314 is described in further detail with respect to FIG. 6 and the associated text.

Figure 4A:
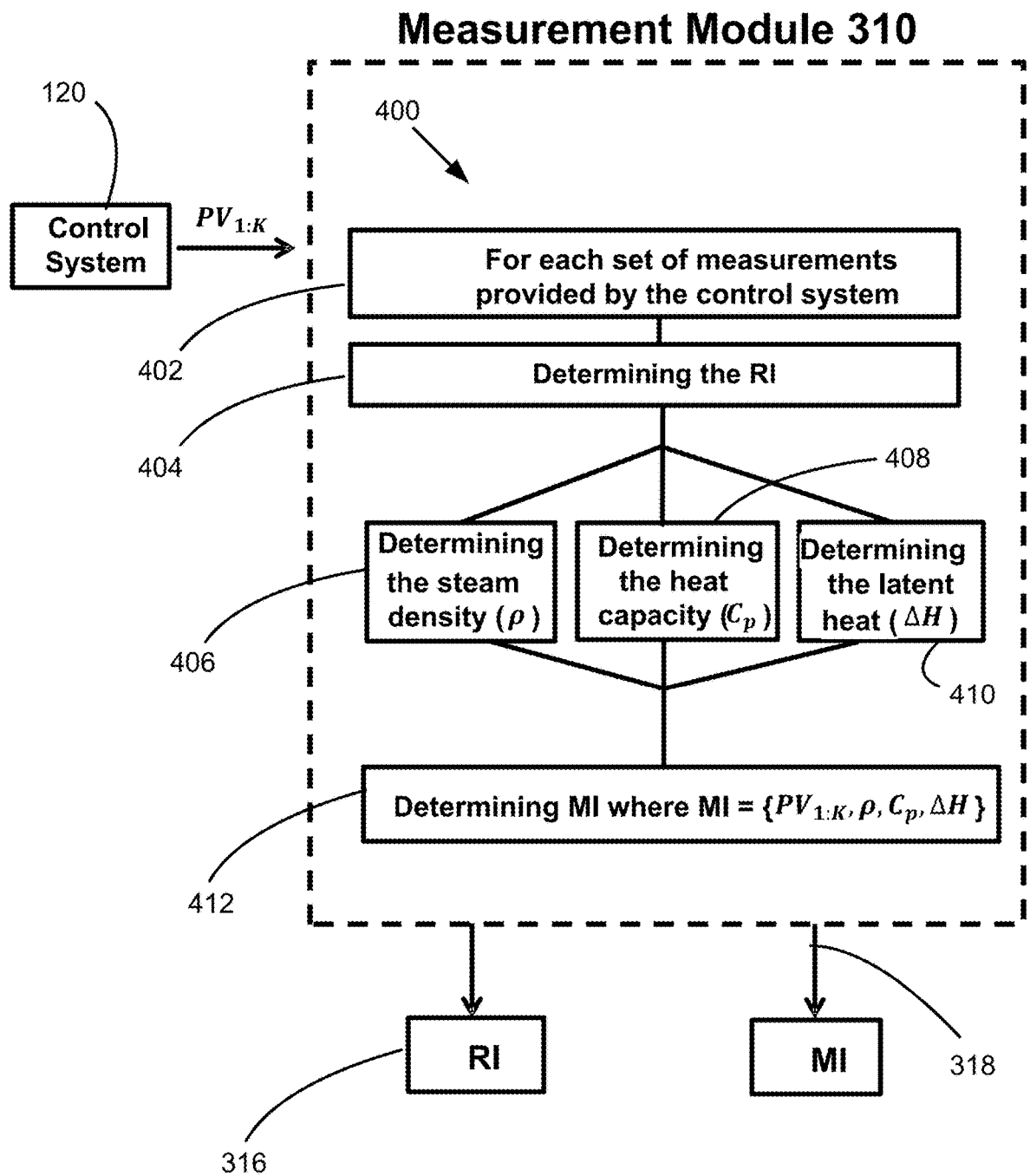
FIG. 4A illustrates a flowchart of an example embodiment of a measurement method performed by a measurement module in accordance with the teachings herein.

Referring now to FIG. 4A, shown therein is a flowchart of an example embodiment of a measurement method 400 that can be performed by the measurement module 310 in accordance with the teachings herein. In executing method 400, the measurement module 310 generally takes the input values for the process variables $PV_{1:K}$ from the control unit 120 at act 402 for the individual passes and the recombined pass and then, for each individual pass, determines the RI value 316 and the steam density p, the heat capacity $C_p$, and the latent heat $\Delta H$ during acts 402 to 410. The values for the process variables $PV_{1:K}$ and the steam density p, the heat capacity $C_p$, and the latent heat $\Delta H$ form part of the MI variables 318 at act 412. Although some of the variables, such as the heat capacity (see element 408 at FIG. 4A), may be the same for each pass, these variables can still be determined for each pass to improve the robustness of the steam quality estimate.

In this example embodiment, at act 404, the measurement module 310 determines the RI value 316 using the existing process measurements. The RI value 316 provides an indication of the reliability of the process measurements, which represent the operating conditions of the steam generator 102. The RI value 316 is also used by other stages of the steam quality sensor 140 for determining other values. For example, in an operating OTSG, the measurements of flowrate, pressure and temperature are usually contaminated with unreal values (i.e. outliers). Also, other operational actions, such as maintenance, will drive the process away from the desired operating condition. Accordingly, in order to detect outliers and protect the accuracy of steam quality estimation from undesired conditions, the RI value 316 is determined.

Figure 4B:
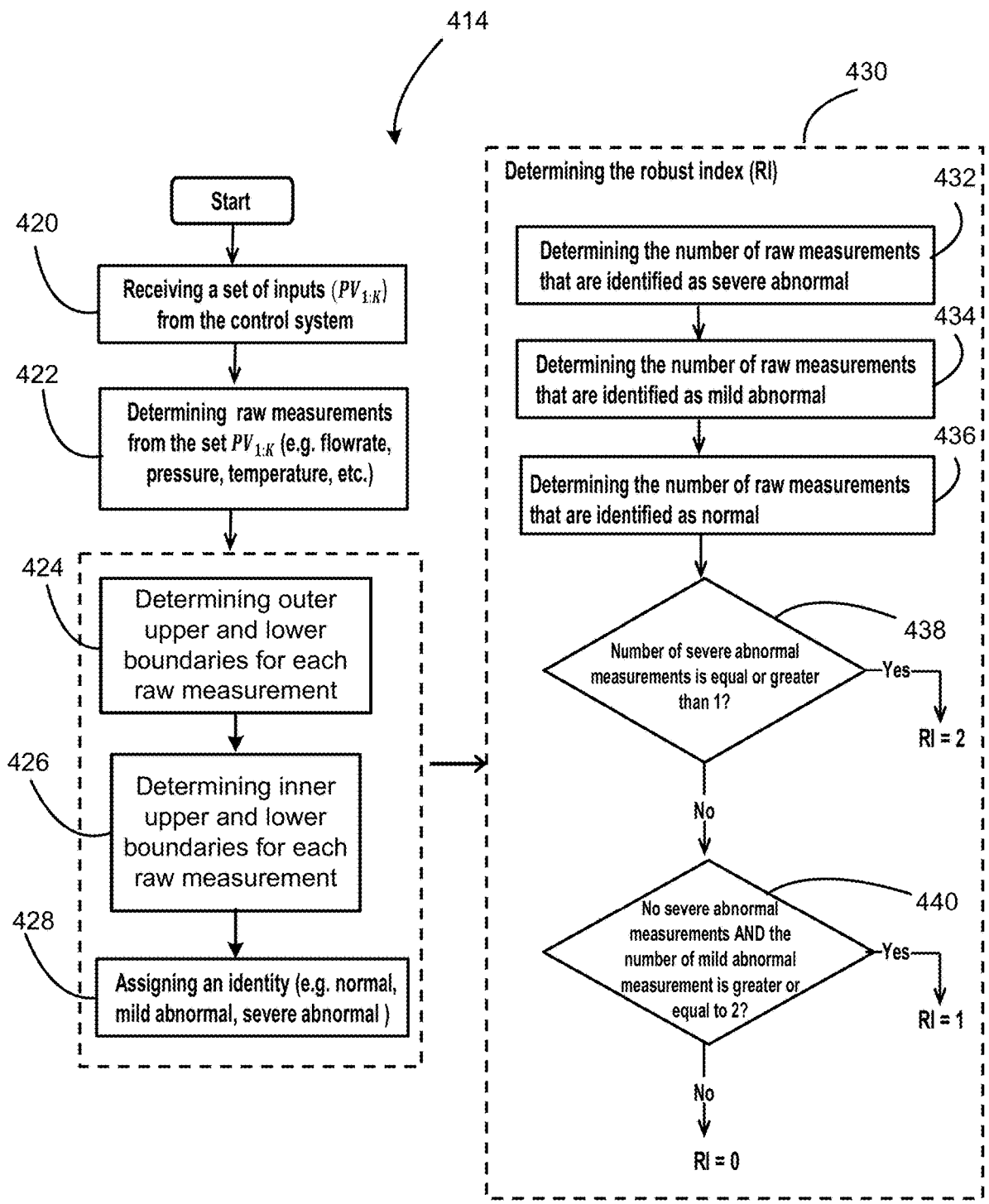
FIG. 4B illustrates a flowchart of an example embodiment of a robustness index determination method for determining a value for a robustness index in accordance with the teachings herein.

Referring now to FIG. 4B, there is shown a flowchart of an example embodiment of a robustness index determination method 414 for determining a value for the RI 316 in accordance with the teachings herein.

At act 420, a set of inputs are received from the control unit 120. For example, the set of inputs can be the process variables $PV_{1:K}$. At act 422, raw measurements (e.g. flowrate, pressure and/or temperature of an inlet or individual pass of the steam generator 102) are determined from the set of inputs.

At acts 424 and 426, outer upper and lower boundaries as well as inner upper and lower boundaries, respectively, are determined for each raw measurement X resulting in four boundaries (i.e. two outer boundaries and two inner boundaries). In an alternative, if desired, the user can monitor a combination of the process variables such as a ratio of two process variables (e.g. PV1/PV2). The boundaries can be used to signify different situations. For example, if a process variable crosses one of the outer boundaries this can be used to stop the steam quality estimate determination since the process variable may not be reliable, and if a process variable crosses one of the inner boundaries then this can be used to warn the user that a process variable may be becoming unstable.

For example, these boundaries can be defined as follows below according to the Hampel method:

$$\text{outer upper and lower boundaries: } Med(X) \pm 6*MAD(X) \quad (5)$$

$$\text{inner upper and lower boundaries: } Med(X) \pm 3*MAD(X) \quad (6)$$

where Med(X) is the median value of X, and MAD(X) is the variance measurement according to equation 7 for a certain number of past measurements of X.

$$MAD(X) = Med(|X - Med(X)|) \quad (7)$$

A pre-determined value can be used to determine the number of past measurements that are used and this pre-determined value can depend on the sampling rate and training dataset that are used. The training dataset that may be used can be based on data that represent typical operating conditions for OTSGs. For example, samples from previous three months of data may be used for the training dataset.

In an alternative embodiment, values for these four boundaries can be determined using existing trip points (e.g. HH, H, L, LL values) from the OTSG 102, and/or calibrated with process operation information. For example, by calibration, it should be understood that once engineers have more information other than the existing trip points to represent the normal operating conditions, then this information can be used for setting up proposed boundaries. For example, if the user knows that the outlet temperature should not exceed 400 degrees Celsius, then the outer upper boundary for the outlet temperature process variable can be set to 400 degrees Celsius.

At act 428, abnormal values for the raw measurements X can then be detected using these boundaries. For example, each measured value X can be assigned an identity or label such as: (a) normal when it has a value within the inner boundaries; (b) mild abnormal when it has a value beyond the inner boundaries but within the outer boundaries; or (c) severe abnormal when it has a value beyond the outer boundaries. In an alternative embodiment two boundaries may be used instead of four, in which case the label for the measured value can either be assigned as normal or abnormal. In another alternative embodiment, six boundaries may be used, in which case the label for the measured value can either be assigned as normal, slightly abnormal, abnormal, or severely abnormal. In either case, the overall quality of the raw measurements X can be determined by the number of abnormal measurements.

At act 430, based on this assigned identity (i.e. assigned label) of each process measurement, the robustness index (RI) for a given sample point or time index can be obtained using the operations in acts 432 to 440. At act 432, the number of raw measurements X that are identified as severe abnormal is determined. At act 434, the number of raw measurements X that are identified as mild abnormal is determined. At act 436, the number of raw measurements X that are identified as normal is determined.

At act 438, if the number of identified severe abnormal measurements is equal to or greater than one, then the RI value 316 is assigned a value of 2. In an alternative embodiment, there may be two possible values of RI in which case one of these values can be similar to combining the cases in which RI=1 and RI=2 in the embodiment where RI can have three values or one of these values can be similar to combining the cases in which RI=0 and RI=1 in the embodiment where RI can have three values. The actions associated with RI=1, RI=2 and RI=3 in following steps can be used accordingly.

If this condition at act 438 is not true, then the method 414 proceeds to act 440 at which point there are no severe abnormal measurements and it is determined whether the number of mild abnormal measurements is greater or equal to 2. If these conditions are true then the RI value 316 is given a value of 1. Otherwise, if the conditions of act 440 are not satisfied then the RI value 316 is assigned a value of 0. An RI value of 0 indicates that the measurement values X are reliable (i.e. there are no outliners) and the steam generator 102 is in a good operating condition.

Referring again to FIG. 4A, at act 406, the steam density ($\varphi$ is determined using some of the raw measurements X for each individual pass of the steam generator 102'. For example, the steam density ($\varphi$ can be determined from the steam temperature and the steam pressure by using an empirical function provided by the International Association for the Properties of Water and Steam (see equations 15-17 and Tables 11-14 from Wagner, Wolfgang, et al. "IAPWS industrial formulation 1997 for the thermodynamic properties of water and steam." *International Steam Tables: Properties of Water and Steam Based on the Industrial Formulation IAPWS-IF97* (2008): 7-150, which is hereby incorporated by reference). Alternatively, there can be other ways to estimate saturated steam properties: such as the Peng-Robinson (PR) or the Peng-Robinson Stryjek-Vera (PRSV) methods. However, the accuracy of the chosen method that is used to estimate the steam properties may differ. For example, the method from IAPWS-IF97, referred to above, has uncertainty ranging from +/−0.3% to +/−0.05% for the operation range of the steam generator. In another alternative some DCS systems use proprietary calculations for determining steam density.

In this example embodiment of the steam quality sensor 140, the individual pass outlet temperature $T_i$ and the recombined outlet pressure $P_r$ at the outlet node 236 can be used to measure the condition at the individual outlet passes of the steam generator outlet 236. For example, it was assumed that the recombined outlet pressure may have a similar value as the pressure of the individual outlet passes as this is an acceptable approximation.

Figure 4C:
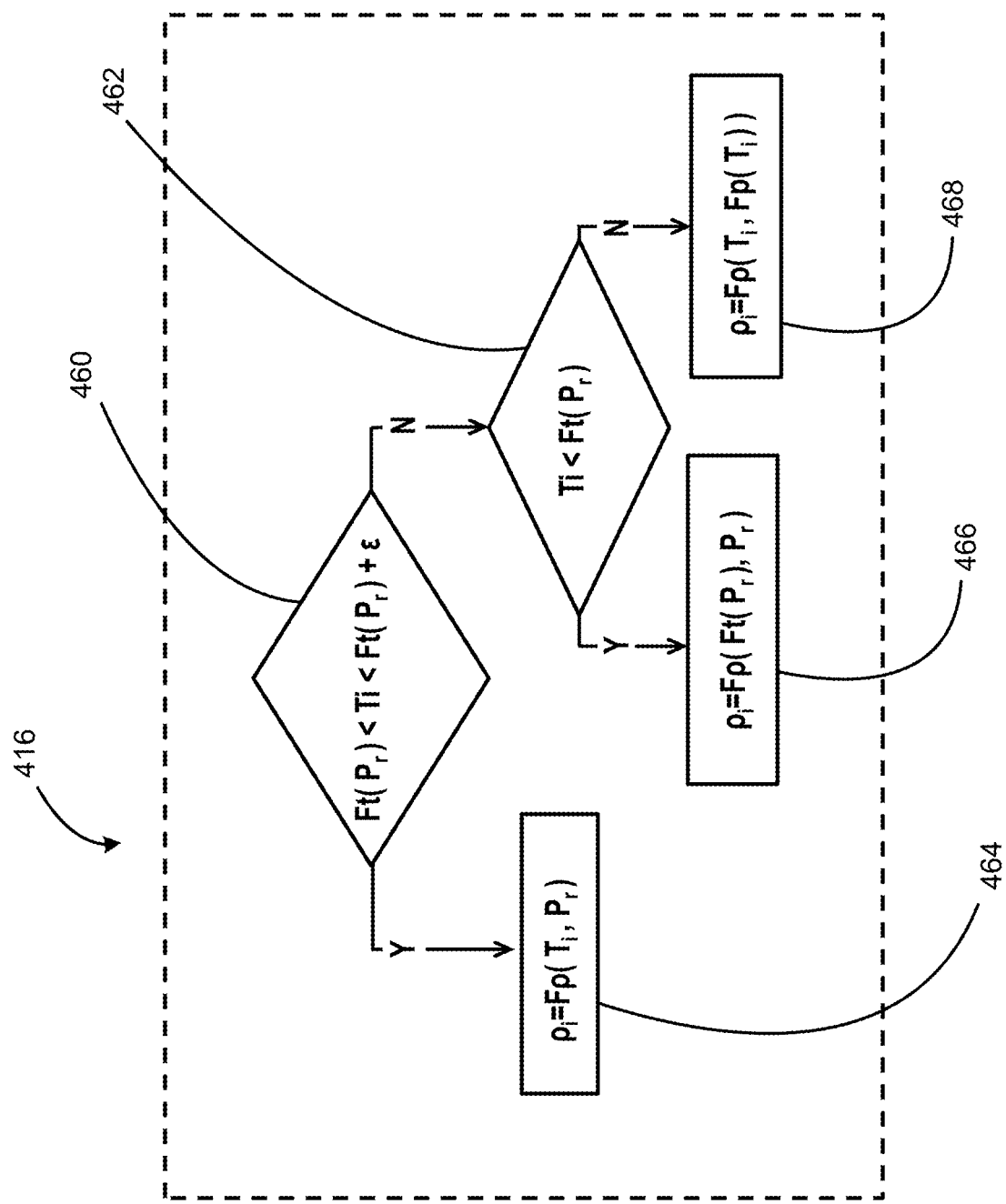
FIG. 4C illustrates a flowchart of an example embodiment of a method for determining a steam density in accordance with the teachings herein.

To determine the steam density $\rho$ with improved accuracy and robustness, the sensor 140 utilizes a switching mechanism to determine the value of the steam density $\rho$, as shown in FIG. 4C, where F$\rho$ is the empirical function for calculating density (see equations (15)-(17) and Tables 11-14 of IAPWS-IF97(2008)), Ft is the empirical function (see equation 31 and Table 34 of IAPWS-IF97(2008)) for calculating saturated temperature from pressure, and Fp is the empirical function for calculating saturated pressure from temperature (see equation 30 and Table 34 of IAPWS-IF97(2008)). All of these tables and equations are hereby incorporated by reference. Alternatively, there can be other ways to estimate the steam density such as the Peng-Robinson (PR) or the Peng-Robinson Stryjek-Vera (PRSV) methods.

Referring to act 460, the satisfaction of the following condition:

$$Ft(P_r) < T_i < Ft(P_r) + \in \quad (8)$$

as shown in FIG. 4C indicates a good condition of both individual pass outlet temperature $T_i$ and the recombined outlet pressure $P_r$ which means that the measured process variables are reliable and can be used in determining steam density ($\varphi$ by using the empirical function Fp. It was found that the pass skin temperature ($T_i$) was higher than the calculated saturated steam temperature based on recombined pressure. Since the individual outlet pass pressure was not available, it was assumed that the recombined outlet pressure represents the individual outlet pass pressure. If equation 8 is satisfied, this assumption is valid and the measured skin temperature is reliable.

At act 460, the parameter $\in$ can be selected according to the specific design of the OTSG 102 that is being monitored and controlled. Usually, selecting $\in=15°$ is recommended. This is based on historical data, and discussions with engineers which indicate that 15 degrees should be a safe region to distinguish reliable temperature readings. This value may depend on design of the OTSGs and the position of corresponding sensors. However, the performance of the steam quality sensor 140 will not be severely affected by this number.

If the condition at act 460 is not satisfied, the method 416 proceeds to act 462, where it is determined whether the condition of equation 9 is satisfied.

$$T_i < Ft(P_r) \quad (9)$$

If the condition of equation 9 is satisfied it means that a poor reliability condition for the sensed temperature has been detected. Thus, individual temperature sensors failed to provide accurate readings in this case. If the temperature is detected as being unreliable, the saturated temperature calculated from $P_r$ (i.e. Ft($P_r$)) will be used to replace $T_i$ as shown at act 466. Otherwise, if $T_i > Ft(P_r) + \in$ then this indicates a poor reliability condition or irrelevance of the measured $P_r$ in which case the saturated pressure can be calculated from $T_i$ using the empirical function Fp to replace the measured value $P_r$, as shown at act 468.

The acts of method 416 are repeated using the Ti for each individual pass of the steam generator 102' to obtain a set of steam density values $\rho = \{\rho_1, \rho_2, \ldots, \rho_m\}$ including steam density values 1 to m for individual passes 1 to m of the steam generator 102' for every time t.

Referring back to FIG. 4A, at act 408, the specific heat capacity $C_p$ of water of the individual passes may be determined from the measured temperature and pressure using empirical functions provided by The International Association for the Properties of Water and Steam (see equation 7 and Tables 204 in Wagner, Wolfgang, et al., as previously mentioned). Alternatively, there can be other ways to determine the specific heat such as using the steam table from "Introduction to Heat Transfer", $6^{th}$ edition. However, the accuracy of the chosen method that is used may differ. For example, the method from IAPWS-IF97, referred to above, has uncertainty of +/−0.3% for specific heat capacity. In this particular case, the inlet temperature $T_f$ and the inlet pressure $P_f$ at the inlet 202 of the steam generator 102' may be used to determine the specific heat capacity $C_p$. The specific heat capacity $C_p$ will be utilized in model 2 and model 3 of the estimator module 312, an example embodiment of which is shown in FIG. 5. The specific heat capacity $C_p$ is referring to the isobaric heat capacity of water.

The specific heat capacity $C_p$ can be determined by using different temperature and pressure measurements, such as the temperature and pressure at the inlet 202. Alternatively, the temperature and pressure from an averaged value of the inlet 202 and outlet 236 may be used. In the steam quality sensor 140, the inlet temperature and pressure are selected since: (1) temperature and pressure are measured by actual sensors at the inlet 202, and no further calculation is needed which is advantageous since having to use other calculations may increase calculation error; and (2) the outlet temperature and pressure at the outlet 236 are always under close-loop control, which is not informative. The specific heat capacity can be used to determine the energy that is used to raise the temperature of a substance by one degree at constant pressure and it is a function of temperature.

At act 410, the latent heat ΔH is determined using enthalpy for each pass of the steam generator 102. The enthalpy of a fluid at a given temperature may be determined using empirical functions such as those provided by equations 15-17 and Tables 11-14 in The International Association for the Properties of Water and Steam (see Wagner, Wolfgang, et al as previously mentioned, which is hereby incorporated by reference). The latent heat ΔH may be defined as the difference between saturated vapour enthalpy and saturated liquid enthalpy. Alternatively, there may be other ways to estimate the latent heat such as using the steam table from "Introduction to Heat transfer", $6^{th}$ edition, which is hereby incorporated by reference. However, the accuracy of the chosen method to estimate the steam properties may differ. For example, the method from IAPWS-IF97 has an uncertainty of approximately +/−0.3% for determining specific heat capacity.

For the example embodiment of the steam quality sensor 140, vaporization is expected to occur at the end of each tube of each pass of the steam generator 102'. Therefore, the individual outlet temperature $T_i$ may be used to determine $\Delta H_i$ for each individual pass i:

$$\Delta H_i = f_{\Delta H}(T_i) = h^{(v)}(T_i) - h^{(l)}(T_3), \quad (10)$$

where $h^{(v)}$ is the function of saturated vapour enthalpy, and $h^{(l)}$ is the function of saturated liquid enthalpy which may be provided by equations 15-17 and Tables 11-14 in the above-noted Wagner et al. reference.

At act 412, values for the MI variables 318 are assembled and stored for use by other components of the steam quality sensor 140. The MI variables includes the process variables ($PV_{1:K}$), the steam density $\rho = \{\rho_1, \rho_2, \ldots, \rho_m\}$ of all individual passes 1 to m, the specific heat capacity $C_p$, and the latent heat $\Delta H = \{\Delta H_1, \Delta H_2, \ldots, \Delta H_m\}$ of all individual passes 1 to m. One overall heat capacity $C_p$ value may be used as inlet temperature may be used to calculate the heat capacity and there is only one inlet temperature for the whole steam generator. In an alternative embodiment, it may be possible to use the average temperature in which case an individual heat capacity for each pass is determined.

The estimator module 312 takes the model inputs 318 comprising the required process variables ($PV_{1:K}$), the steam density values $\rho = \{\rho_1, \rho_2, \ldots, \rho_m\}$ of all individual passes, the heat capacity $C_p$, and the latent heat $\Delta H = \{\Delta H_1, \Delta H_2, \ldots, \Delta H_m\}$ of all individual passes, and provides a raw steam quality estimate 320. The estimator module 312 uses a switching mechanism, as shown by the example embodiment of a raw steam quality estimation method 500 in FIG. 5, to use one of several designed models (in this case one of three models may be selected and used depending on the operating conditions) to determine the raw steam quality estimate 320 with improved accuracy and robustness.

The switching mechanism employed by the raw steam quality estimate method 500 involves determining reliability which may be done in different ways. For example, one approach to determine reliability may be to use the same boundaries as those used by the measurement module 310. Therefore, if the process variable under consideration is assigned as being normal by the measurement module 310, then the process variable is treated as being reliable by the estimator module 312. The switching mechanism selects one of several models depending on the reliability of certain process variables. The selected model is then used to determine the raw steam quality estimate 320.

Alternatively, consultation with production engineers may be done since the production engineers have some beliefs on which sensors are more reliable and which sensors are not. In another alternative, an index can be determined for evaluating robustness. For example, specific weights can be applied to each sensor to emphasize different aspects of reliability. Alternatively, one can run several different models, and see which model gives the closest prediction compared to the lab data and choose that model for use in the field.

Referring to FIG. 5, at act 502 of the raw steam quality estimation method 500, it is determined whether the differential pressure of an individual pass is reliable (FIG. 5 can be applied to each individual pass). If this condition is satisfied, model 1 is selected and used at act 504 to determine the raw steam quality estimate 320. If the condition at act 502 is not satisfied, then the method 500 goes to act 506 where it is determined whether a flow rate of inlet fuel gas and a stack temperature of waste gas are reliable. If this condition is satisfied, model 2 is selected and used at act 508 to determine the raw steam quality estimate 320. Otherwise, model 3 is used to determine the raw steam quality estimate 320, as shown at act 510. Examples embodiments of the three models are shown below.

A steam quality sensor implemented in accordance with the teachings herein is structured to predict steam quality from individual passes in the steam generator. Since no reference data is available for the overall steam quality, there is no ultimate correct answer for the predicted steam quality. One approach that may be used to calculate the overall steam quality is the weighted averaged approach:

$$X_{combined} = \frac{\sum_{i=1}^{p} X_i F_i}{\sum_{i=1}^{p} F_i}$$

where p is the total number of passes and $X_i$ are the final steam quality predictions from individual passes. The method to obtain the final steam quality prediction from the individual passes is explained below.

Model 1

The first model uses the process following variables:

$F_i$ (i=1 . . . m): the flow rate of each individual pass;

$DP_i$ (i=1 . . . m): the differential pressure of each individual pass; and $\rho_i$ (i=1 . . . m): the calculated steam density of each individual pass.

The first model provides the raw steam quality estimate of each individual pass ($X_i$) as:

$$X_i = K \cdot \frac{\sqrt{\rho_i \cdot DP_i}}{F_i} + b. \quad (11)$$

where K and b are regression parameters. The above structure is designed using the two considerations that follow below. To determine K and b, a certain range (such as about 3 months for example) of training data consisting of raw process variables and reference data is obtained. Then mature regression algorithms such as least square error method can be applied to determine K and b from this training data.

First, the mass balance equation between inlet mass flow rates ($\dot{m}_{in}$) and outlet mass flow rates ($\dot{m}_t$) is defined as:

$$\dot{m}_{in}=\dot{m}_{out}=\dot{m}_{out}^{(v)}+\dot{m}_{out}^{(l)} \tag{12}$$

where $\dot{m}_{out}^{(v)}$ and $\dot{m}_{out}^{(l)}$ are mass flow rates of the vapor phase and the liquid phase of the outlet stream, respectively. The steam quality x % is defined as:

$$x\%=\dot{m}_{out}^{(v)}/\dot{m}_{out}=\dot{m}_{out}^{(v)}/\dot{m}_{in}, \tag{13}$$

and $\dot{m}_{in}$ is available from the measurement of $F_i$.

Second, $\dot{m}_{out}^{(v)}$ can be obtained from the outlet differential pressure measurements based on a simplified Bernoulli equation on the orifice plate:

$$\frac{2\cdot(P_1-P_2)}{\rho}=\left(\frac{\dot{m}}{\rho\cdot A_2}\right)^2-\left(\frac{\dot{m}}{\rho\cdot A_1}\right)^2, \tag{14}$$

where the pressure difference (DP=$P_1-P_2$) and the density $\rho$ are available. $A_1$ and $A_2$ are nominal values, which can be obtained from a description of specific orifices. However, they may not be specified in which case they can be included in the constant 'c' below, and incorporated into the 'K' value in Equation (11).

The outlet steam mass flowrate can be determined by:

$$\dot{m}_{out}^{(v)}=\sqrt{2c\cdot\rho\cdot DP}, \tag{15}$$

where c is a constant where c is a part of K and K was determined using regression analysis. Finally, to compensate for the simplifications made, two model parameters are introduced to adjust the regression models as shown in equation (11).

It should be noted that equations 12 to 15 are applied to each individual pass, but the difference between the passes is the value of K's and b's that are used. Since regression analysis is performed on the passes separately, there will be m K's and b's for m-passes.

Model 2

The second model uses the following process variables:

$T_f$: the temperature of the inlet BFW;
$F_i$ (i=1 . . . m): the flow rate of each individual parallel pass;
$T_i$ (i=1 . . . m): the outlet temperature of each individual pass;
$F_{fg}$: the flowrate of the inlet fuel gas;
$F_{air}$: the flowrate of excess air;
$T_{st}$: the stack temperature of waste gas;
$C_p$: the calculated specific heat capacity; and
$\Delta H_i$ (i=1 . . . m): the calculated latent heat of each individual pass.

The second model provides the raw steam quality estimate of an individual pass ($X_i$) as:

$$X_i=\frac{K_1\cdot F_{fg}+K_2 F_{air}-K_3\cdot T_{st}\cdot F_{fg}}{F_i\cdot[C_p(T_i-T_f)+\Delta H_i]}+b \tag{16}$$

where $K_1$, $K_2$, $K_3$, and b are regression parameters that may be determined as was described for parameter K from equation 11. The above structure is designed using the four considerations that follow below.

First, a general energy balance equation can be established between the total energy input ($Q_{in}$) and the total energy output ($Q_{out}$). The energy output for this model can be expressed as the summation of sensible heat ($Q_{out}^{(s)}$) and latent heat ($Q_{out}^{(l)}$):

$$Q_{in}=Q_{out}=Q_{out}^{(s)}+Q_{out}^{(l)} \tag{17}$$

Second, the energy input can be approximately expressed as:

$$Q_{in}=K_1\cdot F_{fg}\cdot K_2 F_{air}-K_3\cdot T_{st}\cdot F_{fg}, \tag{18}$$

where $K_1$, $K_2$ and $K_3$ are model parameters. As $K_1$ controls the most dominant factor, $K_2$ and $K_3$ can be zero in certain circumstances. For example, since $F_{fg}$ represents the dominant variations about energy flow, the coefficient in front of $F_{fg}$ is the most dominant factor. Furthermore, when the second term and the third term make no contribution to the performance on training data, $K_2$ and $K_3$ can be zeros. Alternatively, if regression analysis is performed and it is determined that values for $K_2$ and $K_3$ are significantly smaller than $K_1$ (or when they are close to zero), then the fuel gas flowrate can be used to represent energy input. Appropriate values for the regression parameters can be determined with historical data records of specific processes, or from process knowledge.

Third, the sensible heat is defined as the energy required to raise the temperature to the boiling point:

$$Q_{out}^{(s)}=F_i\cdot C_p\cdot(T_i-T_f). \tag{19}$$

and the latent heat is the energy required in vaporization as shown in equation 20.

$$Q_{out}^{(l)}=F_i\cdot x\%\cdot\Delta H \tag{20}$$

Fourth, an assumption is made that the liquid phase of the steam mixture can be ignored to facilitate the model derivation and increase the prediction robustness. Hence, the total output energy can be expressed as shown in equation 21.

$$Q_{out}=F_i\cdot x\%\cdot C_p\cdot(T_i-T_f)+F_i\cdot x\%\cdot\Delta h \tag{21}$$

Finally, to compensate for the assumptions made above, three regression parameters are introduced to adjust the regression models as shown in equation 16.

Model 3

The third model uses the following process variables:

$T_f$: the temperature of the inlet BFW;
$F_i$ (i=1 . . . m): the flow rate of each individual parallel pass;
$T_i$ (i=1 . . . m): the outlet temperature of each individual pass;
$T_r$, $P_r$: the temperature and pressure of the recombined outlet pass;
$\rho_i$ (i=1 . . . m): the calculated steam density of each individual pass;
$C_p$: the calculated specific heat capacity; and
$\Delta H_i$ (i=1 . . . m): the calculated latent heat of each individual pass.

The third model provides the raw steam quality estimate of the individual pass ($X_i$) as:

$$X=K_4\cdot T_r+K_5\cdot P_r+b^* \tag{22}$$

$$X_i= \tag{23}$$
$$K_6\cdot\frac{\rho\cdot\Delta H\cdot F_f}{\rho_i\cdot\Delta H_i\cdot F_i}\cdot X+K_7\cdot\frac{\rho\cdot C_p\cdot F_f}{\rho_i\cdot\Delta H_i\cdot F_i}[T_r-T_f(t)]-\frac{100\cdot C_p}{\Delta H_i}\cdot[T_i-T_f]$$

where X is an estimate of recombined steam quality, $K_4$, $K_5$, $K_6$, $K_7$ and b* are parameters for this model; and $\rho$ and $\Delta H$ are the steam density and latent heat for the recombined outlet node, respectively, which can be obtained by taking the average of ρ and ΔH calculated from the individual passes. The variable $F_f$ is the overall flowrate, which is obtained as the summation of individual pass flowrates; and $K_4$, $K_5$, $K_6$ and $K_7$ are regression parameters. The above structure is designed with the following two considerations.

First, in this example embodiment, accurate empirical functions can provide accurate estimates for the above steam properties (e.g. heat capacity, latent heat and vapor density) with more reliability, making the regression parameters $K_1$ and $K_2$ easier to identify from the collected historical data. Second, equation (22) provides a data-driven estimate of recombined steam quality from the recombined temperature and recombined pressure.

Figure 7A:
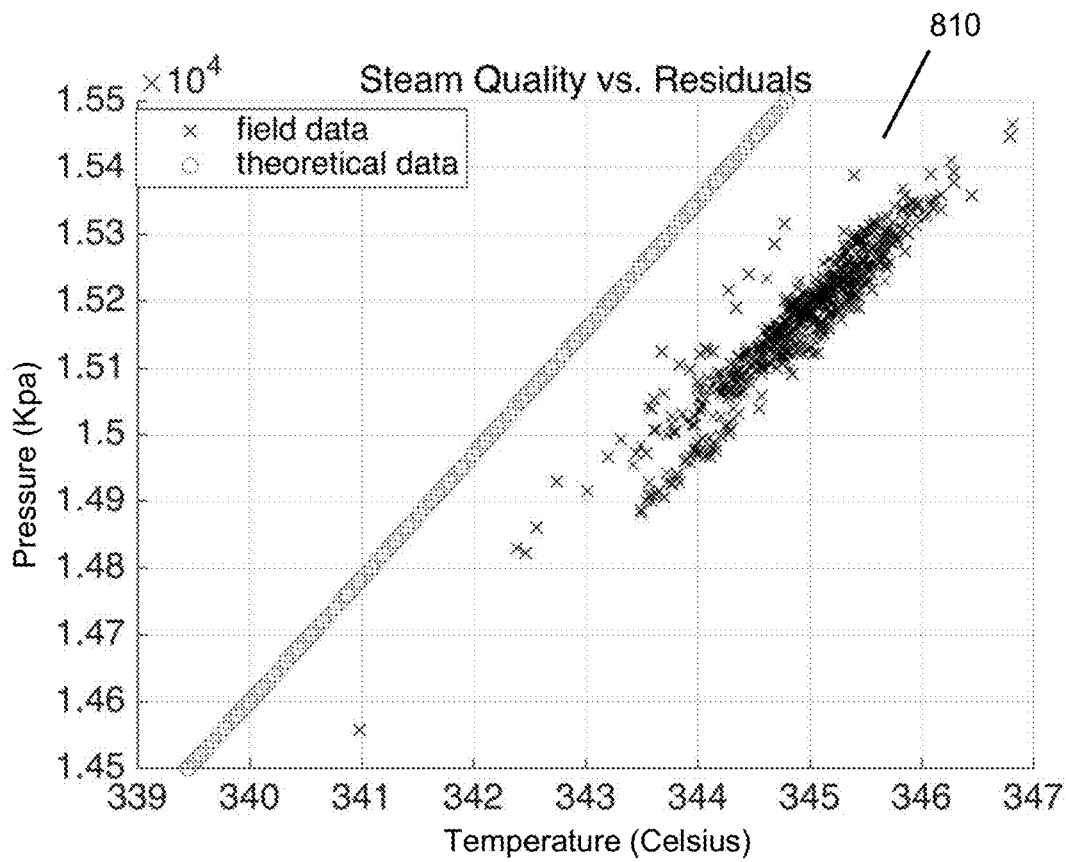
FIGS. 7A and 7B illustrate the correlation among temperature, pressure and steam quality for an output node of a steam generator.
Figure 7B:
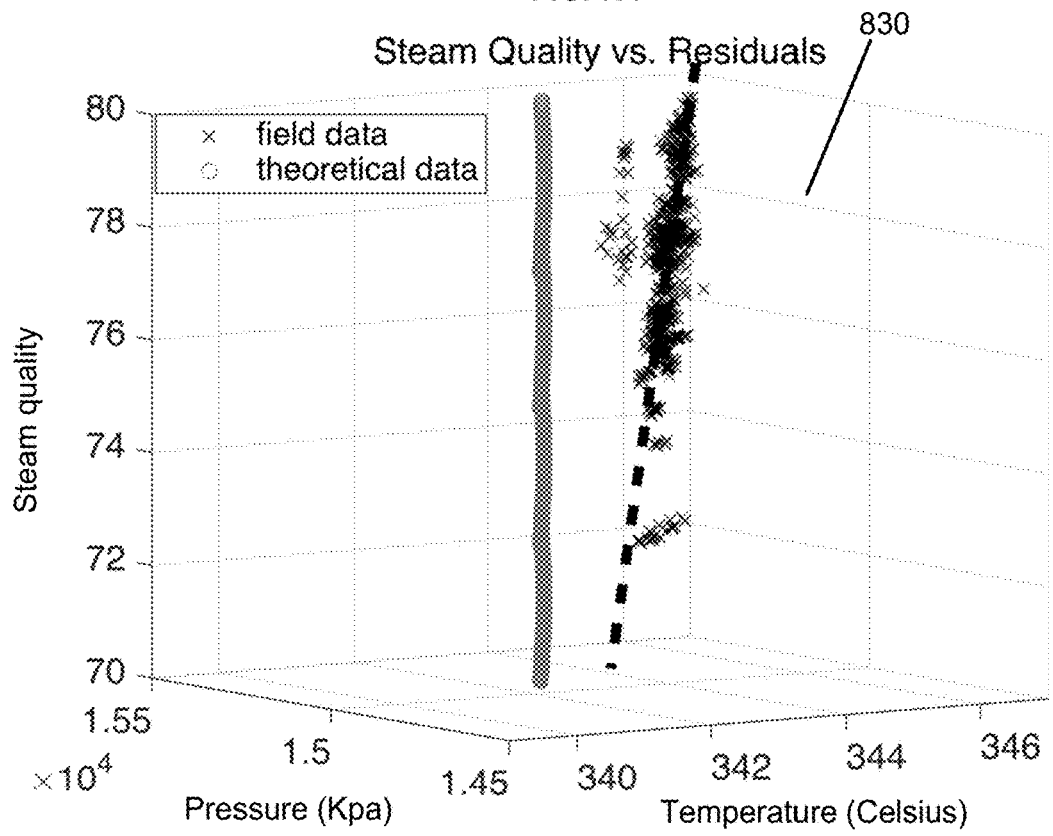

In FIGS. 7A and 7B, there are two plots 810 and 830, respectively, that demonstrate the correlation among temperature, pressure, and steam quality at the OTSG outlet node. In FIGS. 7A and 7B, the x axis is temperature in degrees Celsius and the y axis is pressure in KPa. In addition, in FIG. 7B, the z axis is steam quality. In these plots, the x's are sampled from operating OTSGs and the circles are obtained from the theoretical calculations of temperature, pressure, and steam quality in a static scenario of a saturated steam water mixture as discussed in reference IAPWS-IF97 (2008). From the plots, it can be observed that the bias (or residual) of the sampled data from the theoretical correlation is highly correlated with the steam quality values. This phenomenon indicates that the fluctuations in steam quality will affect the correlation between temperature and pressure at the outlet node of operating OTSGs.

In accordance with the teachings herein, the theoretical correlation (represented by circles) is approximated (i.e. modelled) with a straight line, and the measured steam quality (represented by x's) is approximated (i.e. modelled) by a linear function of the aforementioned residuals from this theoretical line, which is shown as the black dash line. In the application to specific OTSGs, the specific range of outlet pressure can be used to obtain the theoretical correlation (circles). The regression parameters $K_4$, $K_5$, $K_6$, $K_7$, and b* can be identified from historical data records.

Figure 6:
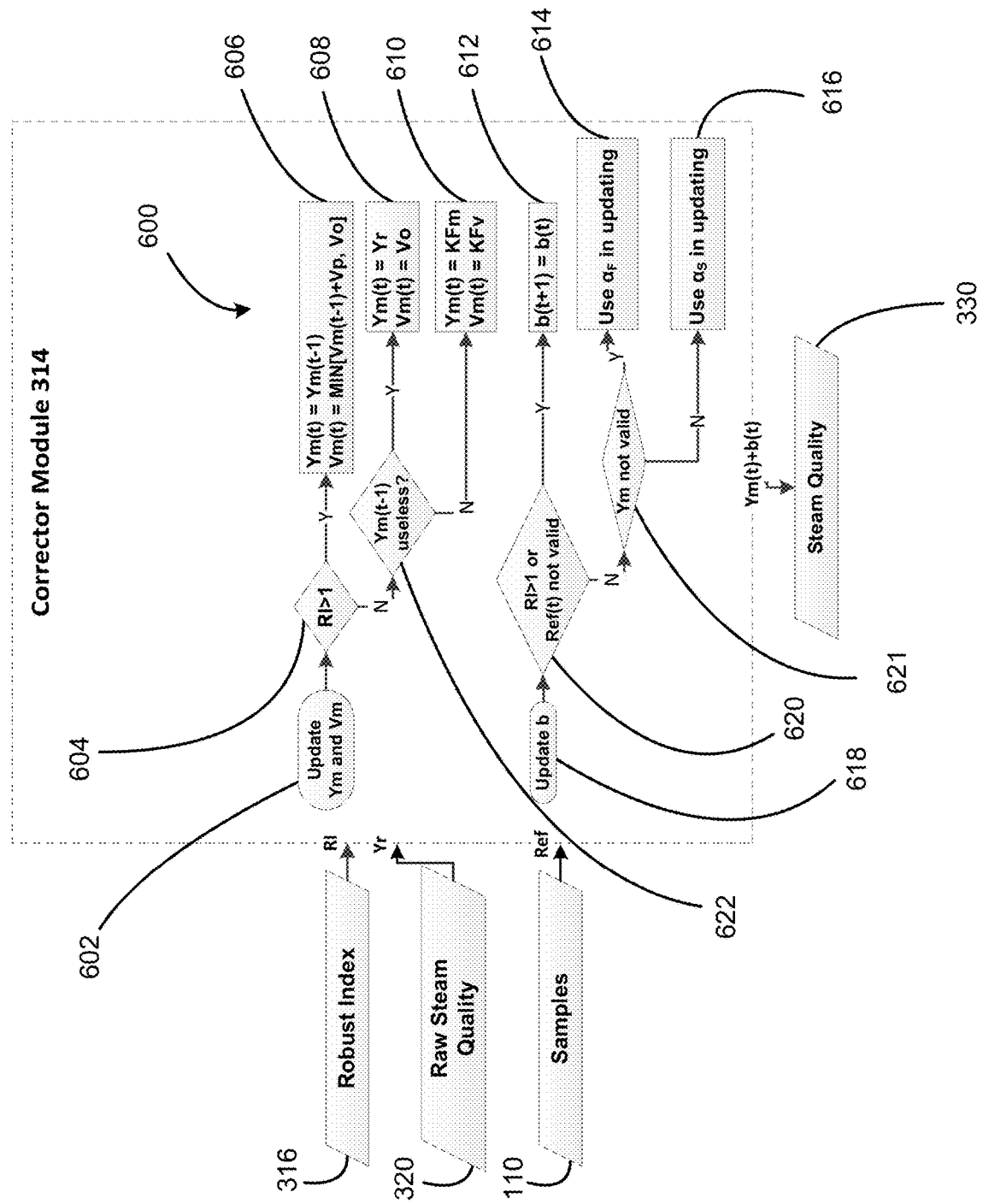
FIG. 6 illustrates a flowchart of an example embodiment of a correction method performed by a corrector module in accordance with the teachings herein.

An example embodiment of a correction method 600 that may be employed by the corrector module 314 is shown in FIG. 6. The corrector module 314 receives inputs including the robustness index value 316, the raw steam quality estimate 320, and a reference value, such as the sampled readings 110, to provide the final steam quality estimate 330. The corrector module 314 includes a state estimator mechanism to smooth the raw steam quality data ($Y_r$) into intermediate steam quality data, defined as $Y_m$, using a bias updating mechanism to eliminate a drifting error in model prediction with the biased term, defined as b, in this correction method 314. The corrector module 314 is configured to deal with unrecognized variations of steam quality and to compensate for simplifications made in the implementation of the estimator module 312. For example, during steady state, the steam quality estimate should not change drastically. The correction method is based on this prior knowledge/assumption and deals with any unrecognized variations that are not informative and thus reduces the variance of the steam quality estimate provided by the steam quality sensor 140. For example, assumptions and approximations can be made for each model used in the estimator module 312 to simplify implementation such as, but not limited to: (1) ignoring the liquid phase; and (2) assuming constant Lower Heating Value (LHV). These simplifications can arise from developing the structure of the current models according to the principles of mechanical energy balance and energy balance.

Since steam quality is one of the physical states in an OTSG, the dynamics of heat transfer implies that a change of steam quality will possess a certain level of inertia. To model this inertia and to smooth the raw steam quality estimates, a variant of the Kalman filter is adopted as shown in equation 24:

$$Y_m(t) = KF_m = \frac{V_O}{V_m(t-1)+V_P+V_O} \cdot Y_M(t-1) + \frac{V_m(t-1)+V_P}{V_m(t-1)+V_P+V_O} \cdot Y_r(t) \tag{25}$$

where the 'state' s represents the smoothed steam quality estimate, modelled by a transition function with parameter $V_P$; the 'observation' x represents the raw steam quality estimate, modelled by an emission function with parameter $V_O$; and $\mathcal{N}$ represents the Normal distribution. Based on this formulation, the distribution of the state s(t) can be estimated from the observations x(t) and the distribution of the state s(t−1) at the previous sampling time according to equation 25:

$$\begin{cases} s(t) = s(t-1) + w(t), & w(t) \sim \mathcal{N}(0, V_P); \\ x(t) = s(t) + v(t), & v(t) \sim \mathcal{N}(0, V_O) \end{cases} \tag{24}$$

where $Y_m$ is the expected value of s, and $V_m$ is an additional variable denoting the probabilistic uncertainty of s. The updating equation of this uncertainty term is given by equation 26.

$$V_m(t) = KF_V = \frac{(V_m(t-1)+V_P) \cdot V_O}{V_m(t-1)+V_P+V_O}. \tag{26}$$

In addition to the above algorithm, the state estimator is also designed for different operating conditions.

Referring now to FIG. 6, at act 602 of the correction method 600, the intermediate steam quality data $Y_m$ and the parameter $V_m$ are updated according to equations 25 and 26. At act 604, it is determined whether the robustness index RI is greater than 1. With the help of the robustness index, different updating equations for $Y_m$ and $V_m$ can be used for different operational conditions, as shown in FIG. 6. For example, at act 606, when the robustness index RI is greater than 1 (e.g. the stopping scenario), $Y_m$ will be held constant and $V_m$ will increase by $V_P$ at every time step, until reaching a lower limit of $V_O$. During the stopping scenario, the correction method 600 will not be applied to the steam quality sensor 140 and the steam quality sensor 140 will not give updated predictions (i.e. during the stopping scenario it is as if the steam quality sensor 140 does not operate).

Otherwise, if the condition at act 604 is not satisfied, then the method 600 goes to act 622 where it is determined whether the steam quality sensor 140 is working, but it is also determined whether the previous $Y_m$ is available. The term "is working" means that the steam quality sensor 140 is providing meaningful predictions. The "useless" condition in box 622 is determined by whether the value of Ym(t−1) is provided when the steam quality sensor 140 is operational (i.e. when there is no stopping scenario). For example, RI will indicate whether the input values of the process variables used by the steam quality sensor 140 are reliable or not. For example, when RI>1 then these input values are considered not reliable and the steam quality sensor 140 will not give updated predictions and when RI<1, then this indicates that these input values are reliable and the steam quality sensor 140 will provide predicted values. Alternatively, Ym(t−1) will be considered "useless" when there is no value for Ym(t−1) such as when t=1 or when it is lower than a certain threshold (for example less than 60%).

If the previous intermediate steam quality data $Y_m$ is not available (for example at the starting point), then intermediate steam quality data $Y_m$ will be completely dependent on the raw steam quality estimate $Y_r$, and the uncertainty term $V_m$ will be assigned as $V_O$, as shown at act 608. $V_O$ is given as a sensor parameter and may be determined by plotting lab samples vs time, and using the variance of the lab samples as $V_O$. Alternatively, other prior knowledge can be incorporated to determine this value. Otherwise, the corrector module 314 will work according to the aforementioned algorithm (i.e. equations 25 and 26), as shown at act 610.

As the state estimator is intended to produce a smoother estimation of steam quality, according to the teachings herein, other alternative filters may be suitable for this function. For example, an exponentially weighted moving average filter may be used instead of the Kalman filter. However, a Kalman filter provides advantages, as it not only models the value of state (i.e. the steam quality estimate), but also estimates its uncertainty. The estimated uncertainty acts as a weighing factor and can be used to calibrate parameters in the process transition period such as during start up or when recovering from an abnormal status (such as process faults). An abnormal status may occur when the process variable(s) have values that are outside of their normal operating range. For example, when an abnormal status occurs, the estimated variance Vm(t) may be larger than a normal value. By using the aforementioned filter, the variance Vm(t) will gradually converge back to the normal value. During this period, the filter gain, i.e. the weighing factor between Ym(t−1) and Yr(t)), will be optimized for the filtered steam quality.

In order to avoid deviations in steam quality estimation caused by unexpected changes in OTSG operation, such as fouling in the equipment, a bias term is added to the output of the steam quality sensor 140. For example, the updating of the steam quality estimate Y(t) over time may be implemented as shown in equation 27.

$$Y(t) = Y_m(t) + b(t) \qquad (27)$$

As shown at acts 612 to 621, the bias term b will be updated online to capture deviations in the sampled readings (defined as Ref) over time. The speed of this updating will be controlled by a weighting factor $\alpha \in [0,1]$ as shown in equation 28:

$$b(t+1) = \begin{cases} b(t) + \alpha \cdot (Ref(t) - Y(t)), & \text{if Ref available;} \\ b(t), & \text{otherwise} \end{cases} \qquad (28)$$

where a large value of a will drive the value predicted by the steam quality sensor 140 towards the sampled reading (Ref(t)), and a small value of a will give more weight to the value Y(t) predicted by the steam quality sensor 140.

In this example embodiment, to properly consider different operating scenarios, the bias updating procedure is designed to cooperate with the robustness index, as shown in FIG. 6. At act 620, when the robustness index RI is greater than 1 (i.e. the stopping scenario) or if the (slow-rate) sampled reading is not available, the bias term b is not updated as shown at act 612.

At act 621, it is determined whether $Y_m$ is not valid. For example, Ym is not valid when quick updating is required. Based on prior knowledge, the user can determine when quick updating is required. For example, in the current model, the steam quality sensor 140 does quick updating when shutdown (i.e. the stopping scenario) is longer than 1-3 hours.

When the condition "$Y_m$ is not valid" is true, then the method 600 moves to act 614 where a large value of a (i.e. $\alpha_F$) is selected since the steam generation process is in a transient state (such as during start-up) or the model prediction is deemed not trustable (i.e. RI>0). The larger value of alpha ($\alpha_F$) can be used to give more weight to the reference sample. The user can decide which appropriate value $\alpha_F$ is used for alpha (for example, $\alpha_F$=0.5 to 0.99). Alpha can also have a smaller value represented by $\alpha_S$. The value $\alpha_F$ is larger than $\alpha_S$. Typically, $\alpha_F$ is suggested to be 0.7, and as is suggested to be 0.2. Otherwise, if it is determined that the intermediate steam quality data $Y_m$ is valid, a small value of $\alpha$ ($\alpha_S$) is selected at act 616 which occurs during normal operating conditions for the steam generator 102. For example, a small value of alpha may mean that $\alpha_S$=0.1 to about 0.49.

There are two cases where the large value of $\alpha$ ($\alpha_F$) may be selected: 1) within one day after the OTSG restarts from shut down and 2) when the robustness index is one. In addition, consultation with engineers is recommended when selecting other criteria to detect the transient state. For example, the transient state can be defined as occurring during startup or when RI=1. However, based on the steam generator, additional criteria can be used to define a transient state. For example, consultation with engineers gives an alternative to determine whether the predicted values provided by the model are trustable/valid. For example, engineers may add more situations where the larger $\alpha_F$ value can be used.

By incorporating different weight factors, the steam quality sensor 140 can capture the reference value (sampled reading) effectively during the transient period, and also remains robust to human errors in normal operating conditions. The suggested values of the weighting factors are $\alpha_F$=0.7 and $\alpha_S$=0.2. However, it should be noted that these weighting factors can range from about 0 to 0.7. Alternatively, the weighting factors can be learned from historical data.

Figure 8:
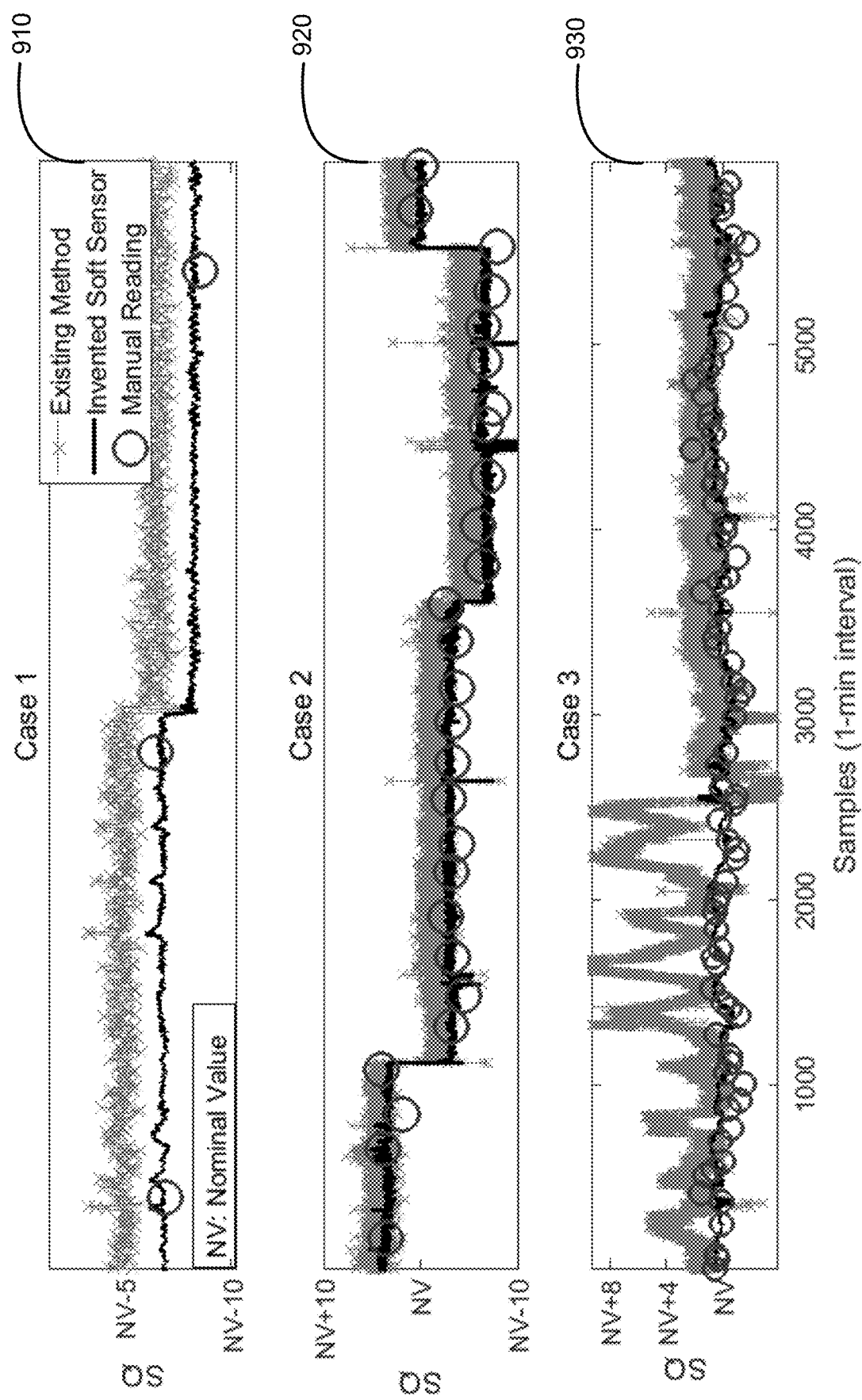
FIG. 8 illustrates a time trend comparison between the steam quality estimates made by a steam quality sensor in accordance with the teachings herein, a conventional steam quality estimator and measured samples for an OTSG under different operational cases.

Referring now to FIG. 8, shown therein is a comparison of steam quality estimates made by the steam quality sensor 140, in accordance with the teachings herein, estimates made by a conventional steam quality estimation method (which involves using one regression model and empirical online tuning techniques) and manual steam quality readings for several passes of an OTSG. The plot 910 shows the results for a first operational case of the OTSG; the plot 920 shows the results for a second operational case of the OTSG; and the plot 930 shows the results for a third operational case for the OTSG.

The performance of a steam quality sensor defined in accordance with the teachings herein, can be evaluated by comparing the error of its estimated steam quality values from sampled readings to the error of a conventional steam quality estimation method with respect to the sampled readings. For example testing showed that the steam quality sensor had a lower mean absolute error and a lower average 3-Sigma compared to a conventional method as follows:

Mean Absolute Error: Conventional method: 1.51, Steam quality sensor: 0.85 (an improvement of 44%); and
Averaged 3-Sigma: Conventional method: 2.17, Steam quality sensor 1.06 (an improvement of 51%).

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A system for determining a steam quality estimate of a steam generator, the system comprising:
an input that is configured to obtain raw measurement values for process variables of the steam generator from sensors coupled to the steam generator;
a steam quality sensor that is configured to receive the raw measurement values for the steam generator and slow-rate steam quality samples in order to determine a steam quality estimate, the steam quality sensor including:
a measurement module that is configured to receive the raw measurement values and determine model input values and a robustness index;
an estimator module that is configured to determine a raw steam quality estimate using the model input values and a model that is selected from several models depending on reliability of a corresponding combination of the raw measurements by:
selecting a first model when a differential pressure of an individual pass of the steam generator is determined to be reliable;
selecting a second model when the differential pressure of an individual pass of the steam generator is determined to be unreliable and when a flow rate of an inlet gas of the steam generator and a stack temperature of waste gas of the steam generator are determined to be reliable;
selecting a third model when the differential pressure of an individual pass of the steam generator, a flow rate of an inlet gas of the steam generator and a stack temperature of waste gas of the steam generator are all unreliable; and
determining the raw steam quality estimate as a function of the selected model; and
a corrector module that is configured to determine the steam quality estimate using the raw steam quality estimate, the robustness index, and the slow-rate steam quality samples;
an output that is coupled to the steam quality sensor and is configured to receive the steam quality estimate; and
a control unit that is coupled to the output, the control unit being configured to receive the steam quality estimate and generate a control signal using the steam quality estimate to control at least one control input of the steam generator to maintain the steam quality of the steam generated by the steam generator within a desired range.

2. The system of claim 1, wherein the measurement module is configured to determine the robustness index by:
determining outer upper and lower boundaries for each of the raw measurement values of the steam generator;
determining inner upper and lower boundaries for each of the raw measurement values of the steam generator;
identifying the raw measurement values at each time point as being normal, mild abnormal and severe abnormal based on a location of the raw measurement values relative to their corresponding outer upper and lower boundaries and the corresponding inner upper and lower boundaries; and
determining the robustness index at each time point based on a number of the raw measurement values being identified as severe abnormal, mild abnormal and normal.

3. The system of claim 1, wherein the model input values are determined by:
determining a steam density for each individual pass of the steam generator;
determining a heat capacity for each individual pass of the steam generator; and
determining a latent heat for each individual pass of the steam generator.

4. The system of claim 3, wherein the steam density is determined based on a saturation condition and measured temperatures and pressures in the steam generator.

5. The system of claim 1, wherein the first model that is used to determine the raw steam quality estimate is based on outlet differential pressure and inlet flowrate of individual passes, and the determined steam density.

6. The system of claim 1, wherein the second model that is used to determine the raw steam quality estimate is based on inlet flowrate and outlet temperature of fuel gas, inlet flowrate of excess air, inlet flowrate, inlet temperature, and outlet temperature of each individual pass, determined specific heat capacity and determined heat of vaporization.

7. The system of claim 1, wherein the third model that is used to determine the raw steam quality estimate is based on temperature and pressure of a recombined outlet node, an inlet flowrate, an inlet temperature, and an outlet temperature of the passes of the steam generator, the determined steam density, the determined specific heat capacity and the determined heat of vaporization.

8. The system of claim 1, wherein the models use regression parameters determined from historical data records of process variables and slow rate steam quality samples.

9. The system of claim 1, wherein the corrector module is configured to filter the raw steam quality estimate, and apply a bias factor that is updated based on the robustness index and the slow rate steam quality samples to reduce the drifting error.

10. The system of claim 9, wherein the corrector module is configured to employ a Kalman Filter to filter the raw steam quality estimate based on the robustness index.

11. The system of claim 1, wherein the at least one control input comprises an input signal for a valve for a boiler feed water inlet to control a flow rate at an input node of the steam generator.

12. The system of claim 1, wherein the at least one control input comprises at least one of a firing rate, an air flow, and an energy flow for a combustion process used by the steam generator.

13. The system of claim 1, wherein the steam generator is a once-through steam generator or another steam generator from which similar process measurements are available.

14. The system of claim 1, wherein the sensors comprise fast-rate hardware sensors of the steam generator including at least one temperature sensor, at least one pressure sensor, at least one differential pressure sensor and at least one flow rate sensor.

15. The system of claim 14, wherein the fast-rate hardware sensors are configured to measure at least one of an inlet temperature, an inlet pressure of a boiler feed water of the steam generator, a flow rate of each individual pass of the steam generator, an outlet temperature of each individual pass of the steam generator, a differential pressure of each individual pass of the steam generator, a temperature or pressure of an outlet of the steam generator, a flowrate of an inlet fuel gas, a flowrate of excess air of the steam generator, and a stack temperature of waste gas.

16. The system of claim 1, wherein the slow rate steam quality samples are obtained from sample points located at outlets of the individual passes of the steam generator.

17. A method of estimating steam quality of a steam generator, the method comprising:
obtaining values for raw measurement values for process variables of the steam generator from sensors coupled to the steam generator;
obtaining slow-rate steam quality samples for the steam generator;
determining model input values and a robustness index based on the raw measurement values using a measurement module;
determining a raw steam quality estimate using an estimator module based on the model input values and a model that is selected from several models depending on reliability of a corresponding combination of the raw measurements by:
selecting a first model when a differential pressure of an individual pass of the steam generator is determined to be reliable;
selecting a second model when the differential pressure of an individual pass of the steam generator is determined to be unreliable and when a flow rate of an inlet gas of the steam generator and a stack temperature of waste gas of the steam generator are determined to be reliable;
selecting a third model when the differential pressure of an individual pass of the steam generator, a flow rate of an inlet gas of the steam generator and a stack temperature of waste gas of the steam generator are all unreliable; and
determining the raw steam quality estimate as a function of the selected model;
determining the steam quality estimate using a corrector module based on the raw steam quality estimate, the robustness index, and the slow-rate steam quality samples; and
sending the steam quality estimate to a control unit that generates a control signal using the steam quality estimate to control at least one control input of the steam generator to maintain the steam quality of steam generator by the steam generator within a desired range.

18. The method of claim 17, wherein the robustness index is determined by:
determining outer upper and lower boundaries for each of the raw measurement values of the steam generator;
determining inner upper and lower boundaries for each of the raw measurement values of the steam generator;
identifying the raw measurement values at each time point as being normal, mild abnormal and severe abnormal based on a location of the raw measurement values relative to their corresponding outer upper and lower boundaries and the corresponding inner upper and lower boundaries; and
determining the robustness index at each time point based on a number of the raw measurement values being identified as severe abnormal, mild abnormal and normal.

19. The method of claim 17, wherein determining the model input values comprises:
determining a steam density for each individual pass of the steam generator;
determining a heat capacity for each individual pass of the steam generator; and
determining a latent heat for each individual pass of the steam generator.

20. The method of claim 19, wherein the method comprises determining steam density based on a saturation condition and measured temperatures and pressures in the steam generator.

21. The method of claim 17, wherein the first model that is used to determine the raw steam quality estimate is based on outlet differential pressure and inlet flowrate of individual passes, and the determined steam density.

22. The method of claim 17, wherein the second model that is used to determine the raw steam quality estimate is based on inlet flowrate and outlet temperature of fuel gas, inlet flowrate of excess air, inlet flowrate, inlet temperature, and outlet temperature of each individual pass, determined specific heat capacity and determined heat of vaporization.

23. The method of claim 17, wherein the third model that is used to determine the raw steam quality estimate is based on temperature and pressure of a recombined outlet node, an inlet flowrate, an inlet temperature, and an outlet temperature of the passes of the steam generator, the determined steam density, the determined specific heat capacity and the determined heat of vaporization.

24. The method of claim 17, wherein the several models use regression parameters determined from historical data records of process variables and slow rate steam quality samples.

25. The method of claim 17, wherein the method comprises using the corrector module to filter the raw steam quality estimate, and apply a bias factor that is updated based on the robustness index and the slow rate steam quality samples to reduce the drifting error.

26. The method of claim 25, wherein the method comprises using a Kalman Filter to filter the raw steam quality estimate based on the robustness index.

27. The method of claim 17, wherein the at least one control input comprises an input signal for a valve of a boiler feed water inlet to control a flow rate at an input node of the steam generator.

28. The method of claim 17, wherein the at least one control input comprises at least one of a firing rate, an air flow and an energy flow for a combustion process used by the steam generator.

29. The method of claim 17, wherein the method comprises measuring at least one of an inlet temperature, an inlet pressure of a boiler feed water of the steam generator, a flow rate of each individual pass of the steam generator, an outlet temperature of each individual pass of the steam generator, a differential pressure of each individual pass of the steam generator, a temperature or pressure of an outlet of the steam generator, a flowrate of an inlet fuel gas, a flowrate of excess air of the steam generator, and a stack temperature of waste gas using fast-rate hardware sensors.

30. The method of claim 17, wherein the method comprises obtaining slow rate steam quality samples from sample points located at outlets of the individual passes of the steam generator.

* * * * *